US010311323B2

(12) United States Patent
Teshima et al.

(10) Patent No.: US 10,311,323 B2
(45) Date of Patent: Jun. 4, 2019

(54) IMAGE PROCESSING APPARATUS FOR CONVERTING IMAGE IN CHARACTERISTIC REGION OF ORIGINAL IMAGE INTO IMAGE OF BRUSHSTROKE PATTERNS

(71) Applicant: Casio Computer Co., Ltd., Shibuya-ku, Tokyo (JP)

(72) Inventors: Yoshihiro Teshima, Tokyo (JP); Masakuni Iwanaga, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 362 days.

(21) Appl. No.: 15/005,623

(22) Filed: Jan. 25, 2016

(65) Prior Publication Data

US 2016/0140411 A1  May 19, 2016

Related U.S. Application Data

(62) Division of application No. 13/615,521, filed on Sep. 13, 2012.

(30) Foreign Application Priority Data

Sep. 28, 2011  (JP) ................. 2011-213375

(51) Int. Cl.
*G06K 9/38* (2006.01)
*G06T 11/00* (2006.01)
*G06K 9/46* (2006.01)

(52) U.S. Cl.
CPC ............. *G06K 9/38* (2013.01); *G06K 9/4604* (2013.01); *G06K 9/4652* (2013.01); *G06K 9/4661* (2013.01); *G06T 11/001* (2013.01)

(58) Field of Classification Search
CPC ...... G06K 9/4604; G06K 9/38; G06K 9/4652; G06K 9/4661; G06T 11/001
See application file for complete search history.

(56) References Cited

U.S. PATENT DOCUMENTS 4,112,423 A * 9/1978 Bertolasi ............ G06F 3/04892
 345/156
4,949,279 A * 8/1990 Takakura ............ G06F 3/04845
 345/162

(Continued)

FOREIGN PATENT DOCUMENTS

JP 61221878 A 10/1986
JP 01219965 A 9/1989

(Continued)

OTHER PUBLICATIONS

Japanese Office Action (and English translation thereof) dated May 19, 2015, issued in counterpart Japanese Application No. 2011-213375.

(Continued)

*Primary Examiner* — Shaghayegh Azima
(74) *Attorney, Agent, or Firm* — Holtz, Holtz & Volek PC

(57) ABSTRACT

An object of the present invention is to obtain an image that is more similar to a real ink-wash painting. An ink-wash painting conversion unit converts data of an original image into data of a painterly image. A characteristic region detection unit detects a characteristic region of the original image from the data of the original image. A conversion unit executes gradation processing of gradating the characteristic region detected by the characteristic region detection unit, and margin setting processing of setting a margin region to be added to the painterly image, as image processing of further converting the data of the painterly image that was converted by the ink-wash painting conversion unit.

5 Claims, 13 Drawing Sheets

(56) References Cited

U.S. PATENT DOCUMENTS

| | | | | |
|---|---|---|---|---|
| 5,038,223 | A * | 8/1991 | Yamada | G06T 11/001 358/445 |
| 7,486,296 | B2 * | 2/2009 | Yao | G06T 11/00 345/473 |
| 8,305,448 | B2 * | 11/2012 | Yoda | G06T 11/60 348/152 |
| 8,610,943 | B2 | 12/2013 | Iwatsuka | |
| 8,908,206 | B2 * | 12/2014 | Cech | G06F 3/1288 358/1.13 |
| 2003/0165262 | A1 * | 9/2003 | Nishikawa | G06T 7/0012 382/128 |
| 2006/0012840 | A1 * | 1/2006 | Fukuda | H04N 1/62 358/518 |
| 2006/0012842 | A1 * | 1/2006 | Abu-Ageel | G02B 6/0001 385/146 |
| 2006/0050317 | A1 * | 3/2006 | Foster | H04N 1/4072 358/3.06 |
| 2007/0127847 | A1 * | 6/2007 | Aoki | H04N 1/3871 382/298 |
| 2008/0297859 | A1 * | 12/2008 | Iwatsuka | H04N 1/387 358/500 |
| 2008/0317348 | A1 * | 12/2008 | Saito | G06K 9/00442 382/182 |
| 2010/0171992 | A1 * | 7/2010 | Pinney | G06F 3/1204 358/3.29 |
| 2011/0176728 | A1 * | 7/2011 | Matsuoka | H04N 1/41 382/166 |
| 2011/0187732 | A1 * | 8/2011 | Odagiri | G06T 11/40 345/582 |
| 2011/0193876 | A1 * | 8/2011 | Handa | G06T 11/001 345/595 |
| 2011/0235905 | A1 * | 9/2011 | Yokokawa | H04N 1/40068 382/165 |
| 2011/0249863 | A1 * | 10/2011 | Ohashi | G06T 11/001 382/103 |
| 2011/0261066 | A1 | 10/2011 | Tsukamoto | |
| 2011/0292062 | A1 * | 12/2011 | Hirotani | G06T 11/60 345/581 |
| 2013/0028471 | A1 | 1/2013 | Teshima | |

FOREIGN PATENT DOCUMENTS

| | | |
|---|---|---|
| JP | 2006114024 A | 4/2006 |
| JP | 2008301168 A | 12/2008 |
| JP | 2009194687 A | 8/2009 |
| JP | 2011139329 A | 7/2011 |

OTHER PUBLICATIONS

Chinese Office Action (and English translation thereof) dated Mar. 18, 2015, issued in counterpart Chinese Application No. 201210364005.3.

Hu, "Research on Cartoon Rendering Technique of NPR", Thesis for Master Degree of Higher Education, 2010.4, p. I138-1197.

Peng, "The Characteristics of Watercolor Painting Language and the Production Guidance for Watercolor Filter", Thesis for Master Degree of Higher Education, Jun. 22, 2007, p. F088-144.

Zhang, et al., "A Method for Image Based Black-ink Rendering", Collected Papers of the 14th Academic Forum on Computer-Aid Designing and Graphics, p. 20-23.

* cited by examiner

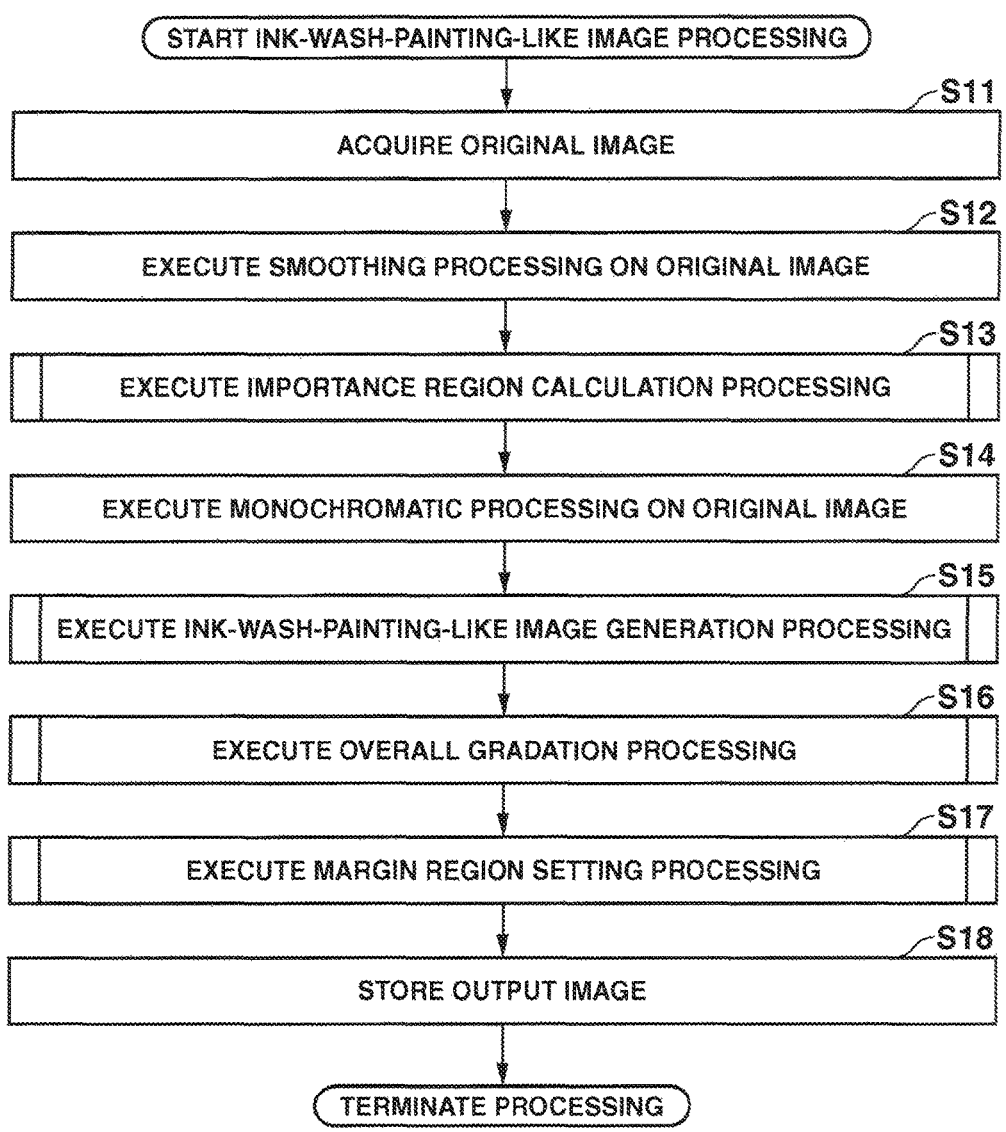

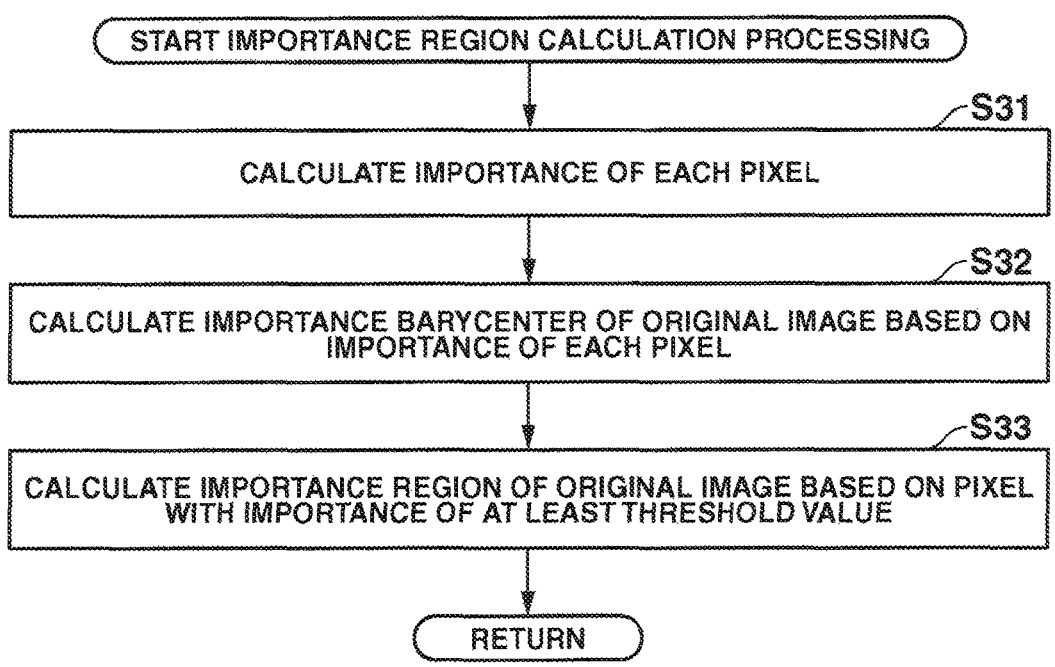

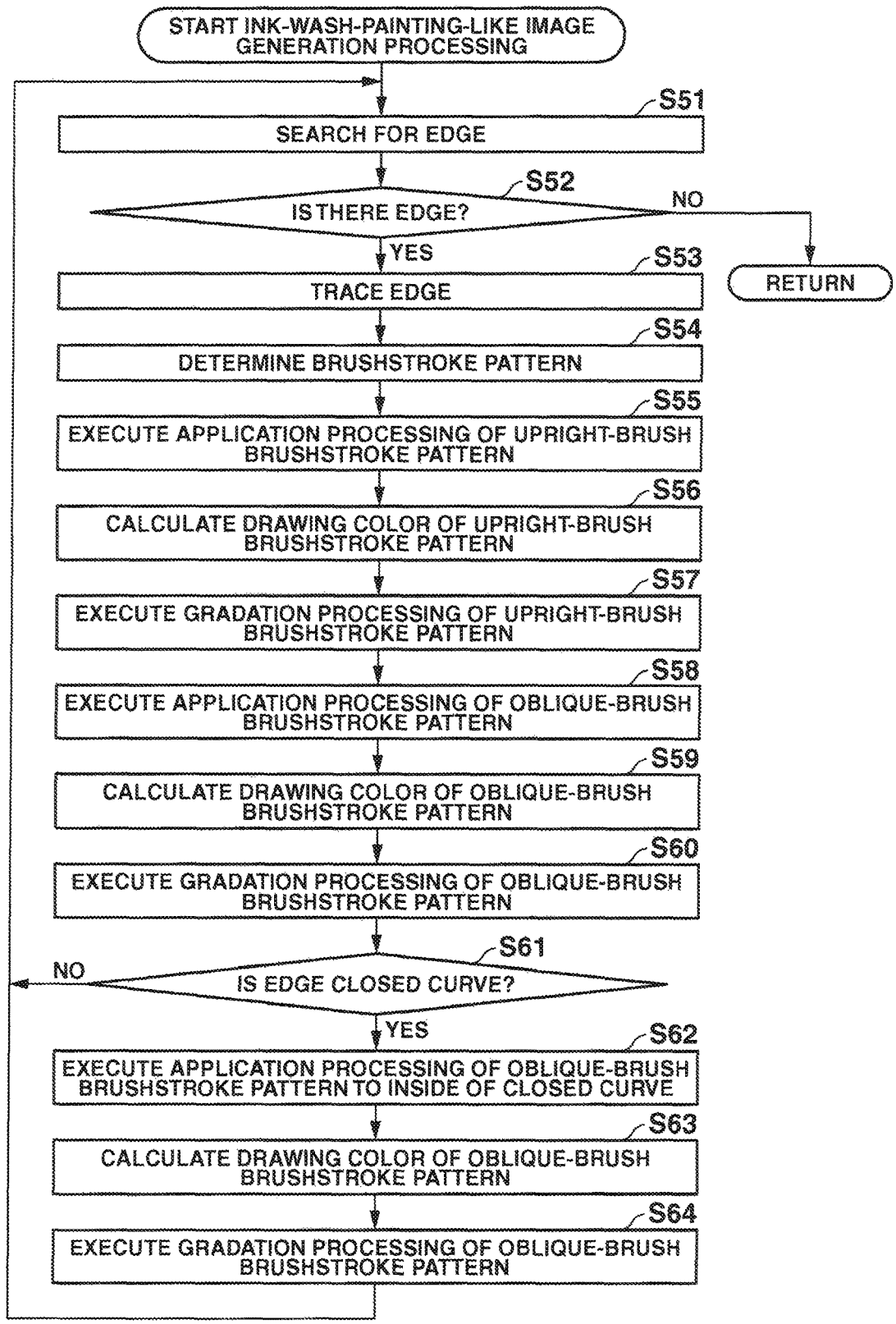

IMAGE PROCESSING APPARATUS FOR CONVERTING IMAGE IN CHARACTERISTIC REGION OF ORIGINAL IMAGE INTO IMAGE OF BRUSHSTROKE PATTERNS

This application is a Divisional application of U.S. Ser. No. 13/615,521, filed on Sep. 13, 2012, which is based on and claims the benefit of priority from Japanese Patent Application No. 2011-213375, filed on Sep. 28, 2011, the contents of both of which are incorporated herein by reference.

BACKGROUND OF THE INVENTION

Field of the Invention

The present invention relates to an image processing apparatus and an image processing method as well as a storage medium.

Related Art

In recent years, image processing is executed on data of an original image to improve artistry for the purpose of enhancing the rendering effects.

For example, Japanese Unexamined Patent Application, Publication No. 2011-139329 discloses painterly conversion processing, which is executed on data of an original image to be converted into data of a painterly image such as an image similar to an oil painting or a colored pencil drawing.

Moreover, in order to accomplish the aforementioned purpose, Japanese Unexamined Patent Application, Publication No. 2006-114024 discloses image processing, in which an edge is detected in data of an original image that includes a person's face as a subject, thereby converting the data of the original image into data of an image that is similar to an ink-wash painting (suiboku-ga) (hereinafter referred to as an "ink-wash-painting-like image") that is a type of an image with high artistry.

However, in the image processing disclosed in Japanese Unexamined Patent Application, Publication No. 2006-114024, only a width of a contour line is converted depending on a facial part, and for example, ink-wash-painting expression is not taken into consideration at all. As a result, a converted image may be an image being remote from a real ink-wash painting in some cases.

SUMMARY OF THE INVENTION

The image processing apparatus according to one aspect of the present invention is characterized by including:

a first conversion unit that converts data of an original image into data of a painterly image; a characteristic region detection unit that detects a characteristic region of the original image, from the data of the original image; and a second conversion unit that executes gradation processing of gradating the characteristic region detected by the characteristic region detection unit, and margin setting processing of setting a margin region to be added to the painterly image, as image processing of further converting the data of the painterly image that was converted by the first conversion unit.

In addition, an image processing method performed by an image processing apparatus to execute image processing on an original image according to one aspect of the present invention, the method including:

a first converting step of converting data of the original image into data of a painterly image;

a characteristic region detecting step of detecting a characteristic region of the original image, from the data of the original image; and a second converting step of executing gradation processing of gradating the characteristic region detected in the characteristic region detecting step, and margin setting processing of setting a margin region to be added to the painterly image, as image processing of further converting the data of the painterly image that was converted by the first converting step.

In addition, a storage medium having stored therein a computer readable program for controlling an image processing apparatus that executes image processing on an original image according to one aspect of the present invention, the program causing a computer to implement functions of:

a first converting unit that converts data of the original image into data of a painterly image;

a characteristic region detection unit that detects a characteristic region of the original image, from the data of the original image; and a second conversion unit that executes gradation processing of gradating the characteristic region detected by the characteristic region detection unit, and margin setting processing of setting a margin region to be added to the painterly image, as image processing of further converting the data of the painterly image that was converted by the first conversion unit.

BRIEF DESCRIPTION OF THE DRAWINGS

FIG. 8 is a flowchart showing an example of a flow of ink-wash-painting-like image processing that is executed by the image processing apparatus shown in FIG. 1 having the functional configuration shown in FIG. 2;

FIG. 9 is a flowchart illustrating importance region calculation processing, regarding the ink-wash-painting-like image processing shown in FIG. 8;

FIG. 10 is a flowchart illustrating ink-wash-painting-like image generation processing, regarding the ink-wash-painting-like image processing shown in FIG. 8;

DETAILED DESCRIPTION OF THE INVENTION

First Embodiment

In the following, a first embodiment of the present invention will be explained with reference to the drawings.

Figure 1:
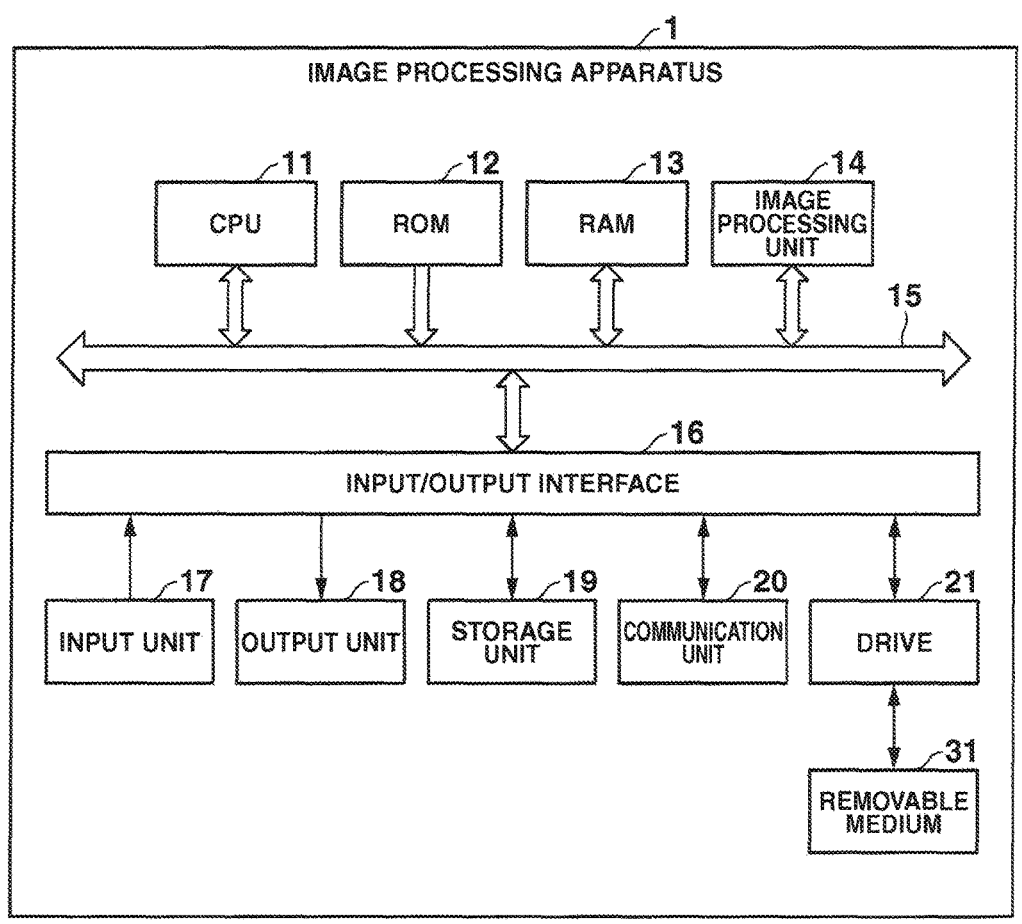
FIG. 1 is a block diagram showing a hardware configuration of an image processing apparatus according to the first embodiment of the present invention.

FIG. 1 is a block diagram showing a hardware configuration of an image processing apparatus according to the first embodiment of the present invention.

The image processing apparatus 1 is provided with a CPU (Central Processing Unit) 11, ROM (Read Only Memory) 12, RAM (Random Access Memory) 13, an image processing unit 14, a bus 15, an input/output interface 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The image processing unit 14 is configured by a DSP (Digital Signal Processor), VRAM (Video Random Access Memory) and the like, and collaborates with the CPU 11 to execute various image processing on image data. Although not described in detail, the image processing unit 14 also includes a function of executing processing on data of an original image to be converted into data of a painterly image such as an image similar to an oil painting or a colored pencil drawing.

The CPU 11, the ROM 12, the RAM 13, and the image processing unit 14 are connected to one another via the bus 15. The bus 15 is also connected with the input/output interface 16. The input/output interface 16 is connected to the input unit 17, the output unit 18, the storage unit 19, the communication unit 20, and the drive 21.

The input unit 17 is configured by a keyboard, a mouse and the like, and inputs various information in accordance with instruction operations by a user.

The output unit 18 is configured by a display, a speaker and the like, and outputs images and sound.

The storage unit 49 is configured by DRAM (Dynamic Random Access Memory) or the like, and stores data of various images.

The communication unit 20 controls communication with other devices (not shown) via a network, which includes the Internet.

Removable media 31 made of a magnetic disk, an optical disk, a magneto-optical disk, semiconductor memory or the like is installed in the drive 21, as appropriate. Programs that are read via the drive 21 from the removable media 31 are installed in the storage unit 19, as necessary. In addition, similarly to the storage unit 19, the removable media 31 can also store various data such as the image data stored in the storage unit 19.

Figure 2:
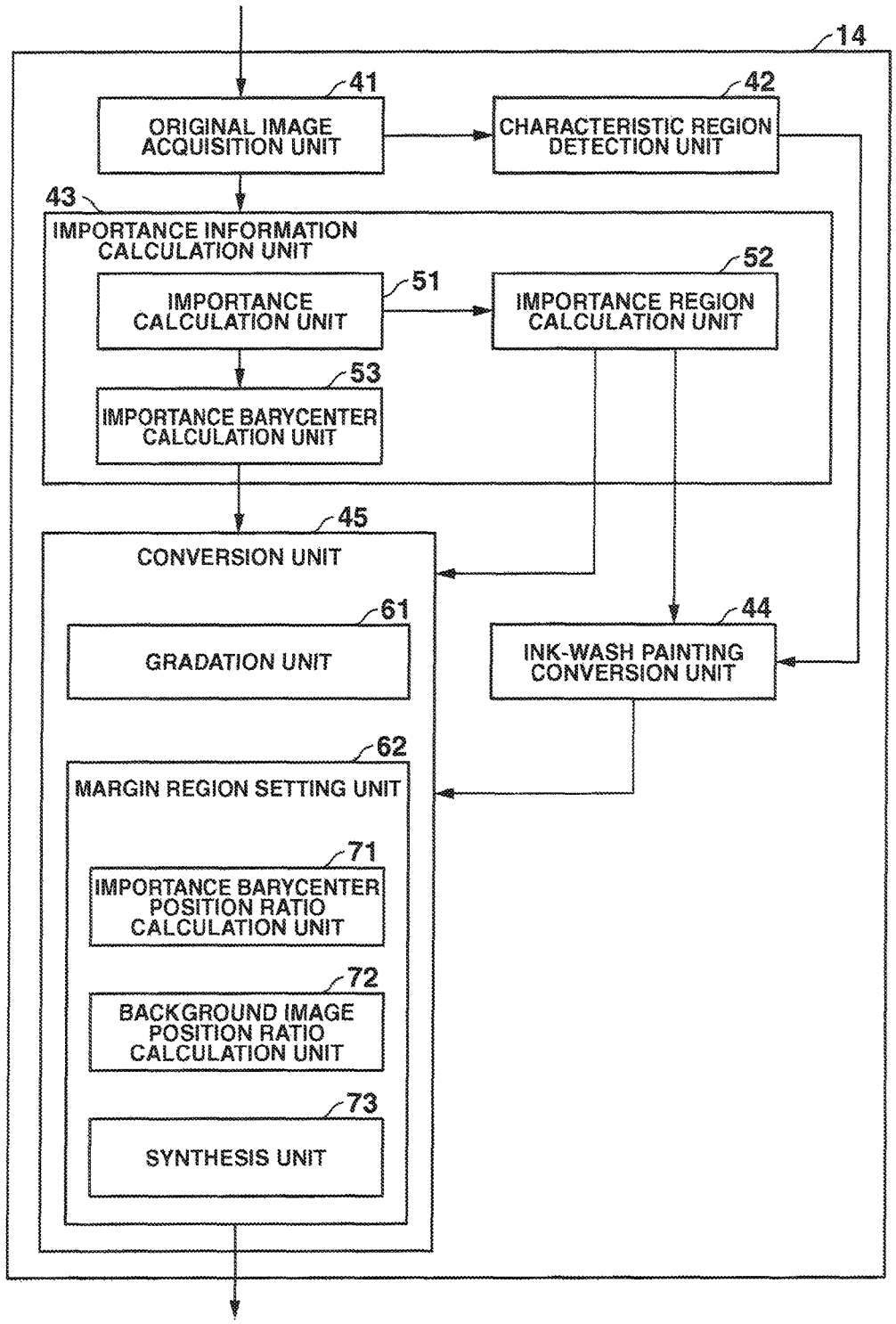
FIG. 2 is a functional block diagram showing a functional configuration for executing ink-wash-painting-like image generation processing, overall gradation processing, and margin region setting processing, in a functional configuration of the image processing apparatus shown in FIG. 1.

FIG. 2 is a functional block diagram showing a functional configuration for executing ink-wash-painting-like image generation processing, overall gradation processing, and margin region setting processing, in the functional configuration of such an image processing apparatus 1.

Here, the ink-wash-painting-like image generation processing refers to a sequence of processing of generating data of an ink-wash-painting-like image from data of an original image that is input as an object of image processing.

The overall gradation processing refers to a sequence of processing of gradating a characteristic region in the ink-wash-painting-like image, based on importance information calculated from the data of the original image.

Moreover, the margin region setting processing refers to a sequence of processing of setting a margin region to be added to the ink-wash-painting-like image, based on the importance information.

In a case in which the ink-wash-painting-like image generation processing is executed according to control by the CPU 11, an original image acquisition unit 41, a characteristic region detection unit 42, and an ink-wash painting conversion unit 44 function in the image processing unit 14. In a case in which the overall gradation processing is executed according to control by the CPU 11, the original image acquisition unit 41, an importance information calculation unit 43, and a conversion unit 45 function in the image processing unit 14.

Moreover, in a case in which the margin region setting processing is executed according to control by the CPU 11, the importance information calculation unit 43 and the conversion unit 45 function in the image processing unit 14.

In addition, a brushstroke pattern storage unit (not shown) is provided as an area of the storage unit 19.

The original image acquisition unit 41 acquires data of an image transmitted from another device and received by the communication unit 20, data of an image that is read from the removable media 31 via the drive 21 and the like as data of the original image, and supplies such data to the characteristic region detection unit 42 and the importance information calculation unit 43.

The characteristic region detection unit 42 executes edge detection processing on data of the original image, and generates data of a binary image, in which, for example, the detected edge is black, and the other portions are white (such a binary image is hereinafter referred to as an "edge image"). The characteristic region detection unit 42 detects a characteristic region for data of the edge image thus generated. Although the object detected as a characteristic region is not limited in particular, it is an edge region in the present embodiment. The data of the edge image thus generated by the characteristic region detection unit 42 is supplied to the ink-wash painting conversion unit 44.

The importance information calculation unit 43 detects importance of each pixel composing an original image, by using a color, brightness, an edge direction or the like as an indicator of importance, from the data of the original image acquired by the original image acquisition unit 41. In addition, the importance information calculation unit 43 generates an importance map indicating spatial distribution of the importance detected for each pixel, thereby executing importance region calculation processing of calculating importance information of the original image.

Figure 3:
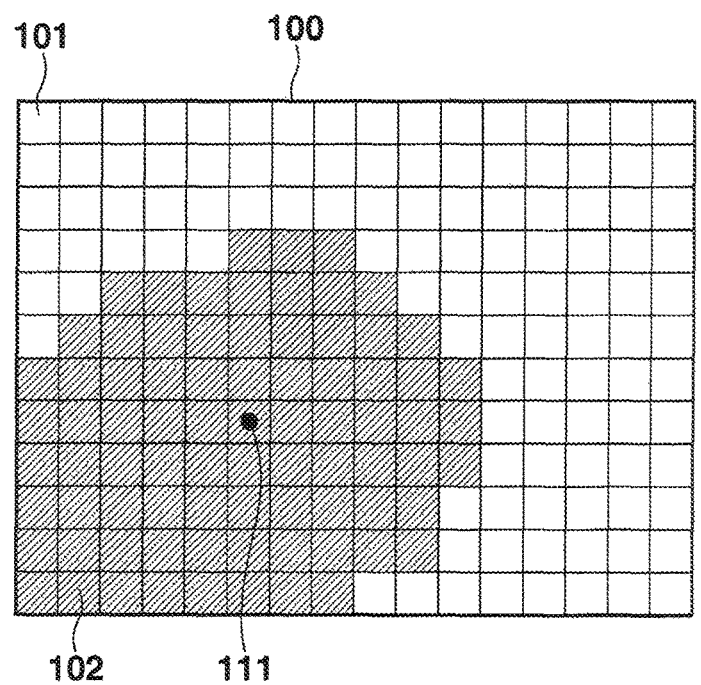
FIG. 3 shows an example of data of an original image.

More specifically, for example, the importance information calculation unit 43 calculates importance information by executing the importance region calculation processing on data of the original image as shown in FIG. 3. The importance information thus calculated by the importance information calculation unit 43 is supplied to the ink-wash painting conversion unit 44 and the conversion unit 45.

FIG. 3 shows an example of data of an original image 100.

In FIG. 3, the importance region 102 is a gray region, among each of a plurality of pixels 101 composing the original image 100. In addition, an importance barycenter 111 calculated based on the importance region 102 is shown in a substantially central portion of the importance region 102.

More specifically, as shown in FIG. 2, in order to execute the importance region calculation processing as such, the importance information calculation unit 43 of the present embodiment includes an importance calculation unit 51, an importance region calculation unit 52, and an importance barycenter calculation unit 53.

The importance calculation unit 51 calculates importance of each pixel composing the original image acquired by the original image acquisition unit 41. For example, in the example shown in FIG. 3, importance of each pixel composing the original image 100 is calculated. The calculation of importance is not limited in particular, but in the present embodiment, the importance calculation unit 51 calculates importance, based on color information, brightness (brightness information), or information of an edge direction, within a predetermined range around each pixel. In this case, since importance cannot be calculated based on only a single pixel, the importance calculation unit 51 calculates importance based on whether pixels as representative values are important for a peripheral region around a particular region with respect to an attention pixel. More specifically, when detecting an edge in a direction different from the direction of the edge around the attention pixel, the importance calculation unit 51 recognizes such a portion as an object having a color different from its peripheral colors, thereby recognizing that a characteristic object is drawn in the portion, and increasing the importance of the portion. The importance information calculated by the importance calculation unit 51 is supplied to the importance region calculation unit 52 and the importance barycenter calculation unit 53.

Based on the importance calculated for each pixel by the importance calculation unit 51, the importance region calculation unit 52 calculates an importance region, for example, the importance region 102 in the example shown in FIG. 3. The calculation of the importance region is not limited in particular, but in the present embodiment, in a case in which an upper limit of an importance evaluation value calculated by the importance calculation unit 51 is assumed to be 100, a region with an importance evaluation value being 90 or higher can be calculated as an importance region. The information of the importance region calculated by the importance region calculation unit 52 is supplied to the ink-wash painting conversion unit 44 and the conversion unit 45.

Based on the importance of each pixel calculated by the importance calculation unit 51, the importance barycenter calculation unit 53 calculates an importance barycenter of the original image. The calculation of an importance barycenter is not limited in particular, but in the present embodiment, when the importance region calculation unit 52 calculates an importance region, the importance barycenter calculation unit 53 calculates a central position in such a region as an importance barycenter. More specifically, at first, the importance barycenter calculation unit 53 calculates an importance barycenter (x, y) in spatial distribution of the importance. The importance barycenter calculation unit 53 calculates the importance barycenter (x, y) by applying Equations (1) and (2) as follows to pixels having importance of at least a threshold value. The threshold value can be appropriately changed by the user as necessary, and in the present embodiment, the threshold value can be 90 in a case in which the upper limit of the importance is 100.

$$mx = 1/(n+\text{sumw}) * \Sigma(x * w(x,y)) \quad (1)$$

$$my = 1/(n+\text{sumw}) * \Sigma(y * w(x,y)) \quad (2)$$

(where n represents the number of pixels having importance of at least a threshold value; sumw represents a sum of the importance; w (x, y) represents importance in (x, y); mx represents an x coordinate of the importance barycenter; and my represents a y coordinate of the importance barycenter).

The importance barycenter information calculated by the importance information calculation unit 43 is supplied to the conversion unit 45.

The ink-wash painting conversion unit 44 executes processing of converting the data of the edge image into data of an ink-wash-painting-like image. Such processing is hereinafter referred to as "ink-wash painting conversion processing".

As the ink-wash painting conversion processing employed in the present embodiment, a texture that imitates handwriting of a writing brush for calligraphy is applied to an original image. Such a pattern of the "texture that imitates handwriting of a writing brush for calligraphy" is referred to as a "brushstroke pattern" in the present specification.

A shape, a size and the like of the texture employed as the brushstroke pattern are not limited in particular. However, two types of brushstroke patterns shown in FIG. 4 are employed in the present embodiment.

FIG. 4 is a diagram showing examples of the brushstroke patterns.

Figure 4A:
FIG. 4A is a diagram showing an example of a brushstroke pattern.

FIG. 4A shows a brushstroke pattern that imitates handwriting in a case of using a portion "the longest hair on the tip" of the writing brush (an extreme tip portion of the writing brush). It should be noted that the brushstroke pattern as shown in FIG. 4A is hereinafter referred to as an "upright-brush brushstroke pattern".

Figure 4B:
FIG. 4B is a diagram showing an example of a brushstroke pattern.

FIG. 4B shows a brushstroke pattern that imitates handwriting in a case of using a lateral portion (a part of the "head") of the writing brush ranging from a "neck (portion adjacent to the extreme tip)" to a "ventral (middle portion)" thereof. It should be noted that the brushstroke pattern as shown in FIG. 4B is hereinafter referred to as an "oblique-brush brushstroke pattern".

As would be easily understood by comparing FIGS. 4A and 4B, the upright-brush brushstroke pattern is characterized in that a length in a direction orthogonal to a longitudinal direction (hereinafter referred to as a "width") is narrow, as a result of which the variation in the gray levels is small. In contrast, the oblique-brush brushstroke pattern is characterized in that the width is wide, as a result of which the variation in the gray levels is large.

In the present embodiment, each data of the upright-brush brushstroke pattern and the oblique-brush brushstroke pattern as described above is stored in a brushstroke pattern storage unit (not shown).

It should be noted that a technique for generating data of the brushstroke patterns is not limited in particular, and for example, a technique for generating data by using CG (Computer Graphics) may be employed. However, the present embodiment employs a technique, in which handwriting actually written on a paper medium with a writing brush soaked in ink (Japanese Sumi) is captured with a scanner or a digital camera to create data of brushstroke patterns.

The ink-wash painting conversion unit 44 executes ink-wash painting conversion processing on data of an edge image, in which the upright-brush brushstroke pattern is applied to an edge region, the oblique-brush brushstroke pattern is applied to a surrounding region of the edge region, and in a case in which the edge region forms a closed region, the oblique-brush brushstroke pattern is applied to an inside of the closed region.

Figure 5:
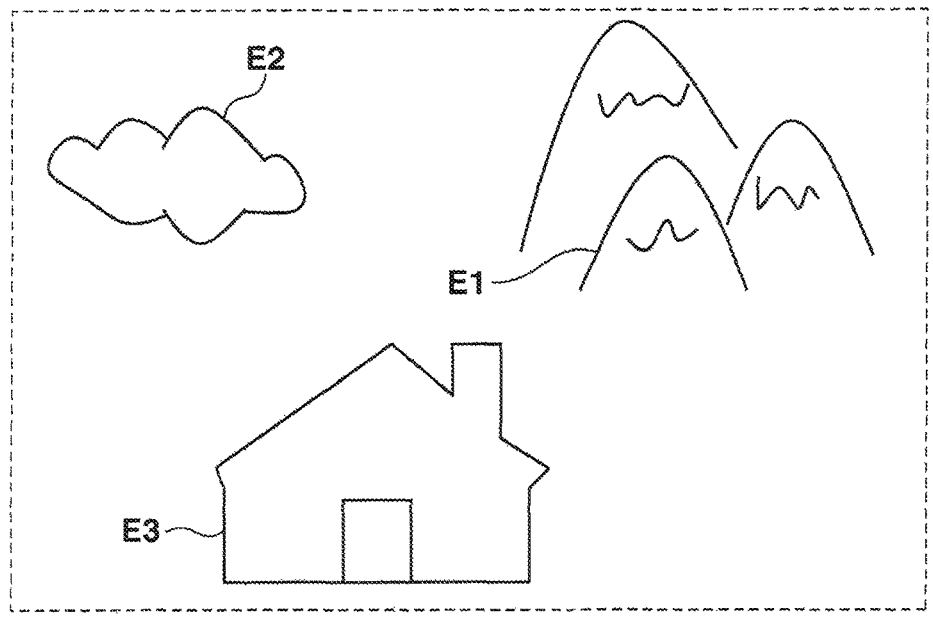
FIG. 5 is a diagram showing examples of edge images.
Figure 6:
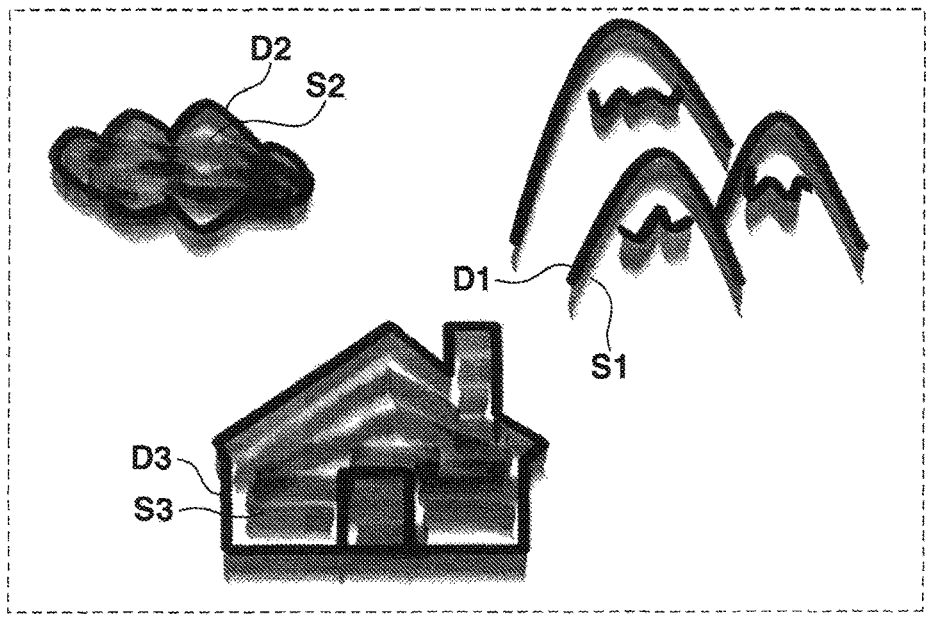
FIG. 6 a diagram showing examples of ink-wash-painting-like images that are converted from the edge images shown in FIG. 5.

More specifically, for example, the ink-wash painting conversion unit 44 executes the ink-wash painting conversion processing on data of an edge image as shown in FIG. 5, thereby generating data of an ink-wash-painting-like image as shown in FIG. 6.

FIG. 5 shows examples of edge images.

In FIG. 5, a black and narrow area is the edge region.

For example, an edge region E1 shows a contour of a mountain, an edge region E2 shows a contour of a cloud, and an edge region E3 shows a contour of a house.

FIG. 6 shows examples of ink-wash-painting-like images that are converted from the edge images in FIG. 5.

An upright-brush brushstroke pattern D1 is applied to the edge region E1 showing the contour of the mountain, and an oblique-brush brushstroke pattern S1 is applied to a surrounding region on the right side of the edge region E1.

Moreover, since the edge region E2 showing the contour of the cloud forms a closed region, an upright-brush brushstroke pattern D2 is applied to the edge region E2, and an oblique-brush brushstroke pattern S2 is applied so as to paint out an inside of the closed region.

Similarly, since the edge region E3 showing the contour of the house forms a closed region, an upright-brush brushstroke pattern D3 is applied to the edge region E3, and an oblique-brush brushstroke pattern S3 is applied so as to paint out an inside of the closed region.

More specifically, in order to execute the ink-wash painting conversion processing as described above, the ink-wash painting conversion unit 44 of the present embodiment executes processing as follows.

More specifically, the ink-wash painting conversion unit 44 detects a characteristic region for data of the edge image. Although the object detected as a characteristic region is not limited in particular, it is an edge region in the present embodiment.

Based on the characteristic region thus detected, the ink-wash painting conversion unit 44 determines a brushstroke pattern to be used from among brushstroke patterns, of which data is stored in the brushstroke pattern storage unit (not shown).

More specifically, in the present embodiment, the ink-wash painting conversion unit 44 determines an upright-brush brushstroke pattern as the brushstroke pattern to be used for the edge region that is the characteristic region. Moreover, the ink-wash painting conversion unit 44 determines an oblique-brush brushstroke pattern as the brushstroke pattern to be used for the surrounding region of the edge region that is the characteristic region, or for the region inside a closed curve of the edge region that forms the closed curve.

The ink-wash painting conversion unit 44 converts the data of the edge image into data of an ink-wash-painting-like image by using data of the brushstroke pattern thus determined.

More specifically, the ink-wash painting conversion unit 44 converts the data of the edge region into data of the upright-brush brushstroke pattern, such that the upright-brush brushstroke pattern is applied to the edge region. Similarly, the ink-wash painting conversion unit 44 converts the data of the surrounding region of the edge region into data of the oblique-brush brushstroke pattern, such that the oblique-brush brushstroke pattern is applied to the surrounding region of the edge region. In addition, in a case in which the edge region forms a closed region, the ink-wash painting conversion unit 44 converts data of the inside of the closed region into data of the oblique-brush brushstroke pattern, such that the oblique-brush brushstroke pattern is applied so as to paint out the inside of the closed region.

Based on the importance map generated by the importance information calculation unit 43, the ink-wash painting conversion unit 44 adjusts each color of the brushstroke pattern used in the ink-wash painting conversion unit 44, i.e. adjusts the gray levels of the ink.

More specifically, as described above, the importance map shows the spatial distribution of the importance of each pixel. On the other hand, the gray level is determined for each brushstroke pattern occupying a region consisting of a plurality of pixel groups.

Accordingly, the ink-wash painting conversion unit 44 extracts, from the importance map, each importance of the plurality of pixel groups included in the region occupying the brushstroke pattern of an adjustment object, and calculates integrated importance of the entire region, based on a plurality of pieces of importance thus extracted.

It should be noted that a technique for calculating integrated importance of the entire region is not limited in particular as long as importance of a plurality of pixels composing the region is used, and for example, a technique for calculating a root mean square and a mean value can be employed. However, in order to easily calculate importance with a small number of calculations in short time, a technique for calculating a simple average of importance of a plurality of pixels is employed in the present embodiment.

The ink-wash painting conversion unit 44 adjusts the gray levels, such that the brushstroke pattern occupying the region is darker (verges on black) as the integrated importance of the entire region is increased, whereas the brushstroke pattern occupying the region is lighter (verges on white) as the integrated importance of the entire region is decreased.

In order to express a blur of the ink, the ink-wash painting conversion unit 44 executes image processing of gradating from the region of the processing object to its perimeter, for each data of the region that was converted into (applied as) a brushstroke pattern by the ink-wash painting conversion unit 44 (this image processing is hereinafter referred to as "gradation processing").

The amount (width) of gradation in the gradation processing is determined depending on the gray levels in the region of the processing object. More specifically, since the gray levels in the region of the processing object are adjusted based on the importance map as described above, the amount of gradation in the region of the processing object is also determined based on the importance map. In this case, as the importance is higher, the color is darker (verges on black), and the amount of gradation is smaller; conversely, as the importance is lower, the color is lighter (verges on white), and the amount of gradation is greater.

Moreover, the manner of gradating each pixel may be a technique that depends on a distance x from an edge of a region of a processing object (a brushstroke pattern), and is not limited in particular; however, the present embodiment employs a technique, in which the color is lighter as the distance x is increased. More specifically, the present embodiment employs a technique, in which the gray scales of an image (a range of brightness indicating the gray levels) are 256 gray scales, and the color gradation (brightness indicating the gray levels) of a pixel of a processing object is calculated according to Equation (3) as follows.

$$B=(255-L)*(1-\exp(-x*x/f(D+n)))+L \quad (3)$$

In Equation (3), B represents the color gradation (brightness indicating the gray levels) of a pixel of a processing object. L represents a color of the brushstroke pattern applied to the pixel of the processing object (brightness indicating the gray levels regarding the entire region of the processing object). f (D+n) represents an arbitrary function, of which output value is increased in accordance with an input parameter (D+n). D represents an amount of gradation in the brushstroke pattern (the region of the processing object) applied to the pixel of the processing object. n represents an arbitrary integer.

The conversion unit 45 includes: a gradation unit 61 that executes overall gradation processing on data of the ink-wash-painting-like image in the characteristic region, based on the importance information calculated by the importance information calculation unit 43; and a margin region setting unit 62 that executes margin region setting processing of setting a margin region of the original image.

Based on the importance of each pixel in the importance region calculated by the importance region calculation unit 52, and based on a distance between each pixel and the importance barycenter calculated by the importance barycenter calculation unit 53, the gradation unit 61 calculates an amount of gradation in each pixel. More specifically, the gradation unit 61 calculates an amount of gradation such that the amount of gradation in the edge is maximized, by gradually changing the brightness toward the white gray scale (256), based on primary approximation by a predetermined function and the Gaussian distribution (normal distribution). In other words, the gradation processing depends on a distance x from the edge of the brush, and the color is lighter as the distance from the edge of the brush is increased. Here, when the amount of gradation is D, and the color (brightness) of the brush drawing is L, a gradation color B is expressed by Equation (4) as follows.

$$B=(255-L)*(1-\exp(-x*x/f(D+n)))+L \quad (4)$$

In the present embodiment, 256 gray scales are used as the gray scales of an image, and a function f represents an arbitrary function that is increased according to a value of D+n. Moreover, n represents an arbitrary integer.

The gradation unit 61 executes gradation processing on the entire image of the ink-wash-painting-like image, based on the amount of gradation calculated for each pixel.

The margin region setting unit 62 executes margin region setting processing on data of the ink-wash-painting-like image, thereby setting a margin region to be added to the ink-wash-painting-like image.

More specifically, as shown in FIG. 2, in order to execute the margin region setting processing as such, the margin region setting unit 62 of the present embodiment includes an importance barycenter position ratio calculation unit 71, a background image position ratio calculation unit 72, and a synthesis unit 73.

The importance barycenter position ratio calculation unit 71 calculates a position ratio of the importance barycenter calculated by the importance barycenter calculation unit 53.

Based on the position ratio of the importance barycenter calculated by the importance barycenter position ratio calculation unit 71, the background image position ratio calculation unit 72 calculates a barycenter position ratio of a white background image.

Based on the position ratio of the importance barycenter calculated by the importance barycenter position ratio calculation unit 71, and based on the position ratio of the barycenter of the background image calculated by the background image position ratio calculation unit 72, the synthesis unit 73 executes synthesis processing such that the data of the ink-wash-painting-like image, on which the gradation processing was executed by the gradation unit 61, is synthesized so as to be superimposed on the data of the white background image. The image processing unit 14 outputs data, on which the synthesis processing was executed, as data of a final output image.

FIG. 7 shows an example of an image after setting a margin region 140 to be added to an ink-wash-painting-like image 120, with the ink-wash-painting-like image 120 and a white background image 130. In the example shown in FIG. 7, the margin region 140 is set as a region between the periphery of the ink-wash-painting-like image 120 and the white background image 130 superimposed with the ink-wash-painting-like image 120.

Figure 7A:
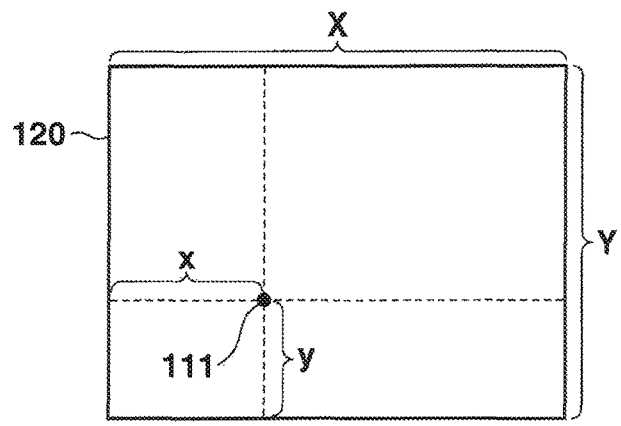
FIG. 7A shows an example of an image after setting a margin region to be added to an ink-wash-painting-like image, by way of an ink-wash-painting-like image and a white background image.
Figure 7B:
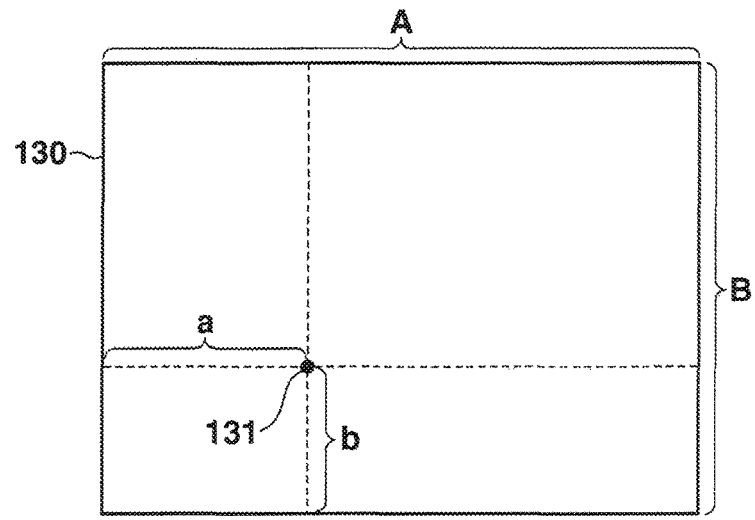
FIG. 7B shows an example of an image after setting a margin region to be added to an ink-wash-painting-like image, by way of an ink-wash-painting-like image and a white background image.

More specifically, FIG. 7A shows the ink-wash-painting-like image 120 having coordinates (x, y) composed of a width X and a height Y of the importance barycenter. In this case, the importance barycenter position ratio calculation unit 71 calculates a position ratio (x/X=y/Y) of the coordinates (x, y) of the importance barycenter 111, with regard to an aspect ratio (X/Y) of the ink-wash-painting-like image 120 having a size of the width X and the height Y. Next, as shown in FIG. 7B, the margin region setting unit 62 sets a width A and a height B for a size of the white background image 130 having an aspect ratio (A/B) that is identical to the aspect ratio (X/Y) of the ink-wash-painting-like image 120. In this case, an equation (X/Y)=α(A/B) is established (where α represents a margin degree).

The margin degree (α) refers to a degree of a size (an area) of the margin region 140 that is set between the ink-wash-painting-like image 120 and the white background image 130. The margin degree can be freely set as appropriate by the user operating the input unit (not shown). In a case in which the margin degree is set high based on the operation by the user, the margin region setting unit 62 sets the size (the area) of the margin region 140 large, and in a case in which the margin degree is set low, the margin region setting unit 62 sets the size (the area) of the margin region 140 small. The background image position ratio calculation unit 72 calculates a position ratio (a/A=b/B) of the white background image 130, which would be the same position ratio as the position ratio (x/X=y/Y) of the importance barycenter 111 calculated by the importance barycenter position ratio calculation unit 71. In other words, (a, b) are calculated such that Equations (5) to (7) as follows are established.

$$(X/Y)=\alpha(A/B) \quad (5)$$

$$(x/X=y/Y) \quad (6)$$

$$(a/A=b/B) \quad (7)$$

(where (a, b) represent coordinates (a, b) of the barycenter 131 of the white background image 130).

Figure 7C:
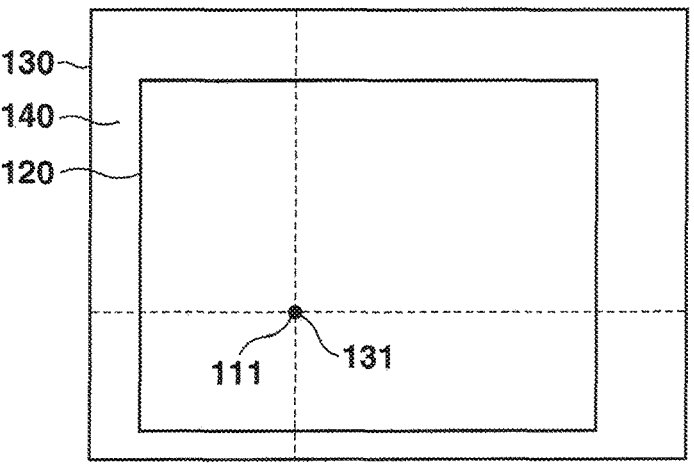
FIG. 7C shows an example of an image after setting a margin region to be added to an ink-wash-painting-like image, by way of an ink-wash-painting-like image and a white background image.

According to above Equations (5) to (7), when the position ratio of the importance barycenter 111 of the ink-wash-painting-like image 120 (the original image) is deviated to one side, the barycenter 131 of the white background image 130 will also be deviated to the same side. Moreover, in a case in which the importance is biased toward a certain portion, the background image position ratio calculation unit 72 calculates such that the margin region 140 on a side of such a portion is small, and the margin region 140 on a side far from such a center of importance is large. Therefore, the ink-wash-painting-like image 120 (the original image) can be displayed by respecting an object that is desired to receive attention. In addition, as shown in FIG. 7C, the margin region setting unit 62 executes the synthesis processing of synthesizing each data of the ink-wash-painting-like image 120 and the white background image 130, such that the coordinates (x, y) of the importance barycenter 111 of the ink-wash-painting-like image 120 (the original image) coincide with the coordinates (a, b) of the barycenter 131 of the white background image 130.

Next, the ink-wash-painting-like image processing executed by the image processing apparatus 1 having such a functional configuration shown in FIG. 2 is described.

FIG. 8 is a flowchart illustrating an example of a flow of the ink-wash-painting-like image processing.

When the original image acquisition unit 41 acquires data of an original image, the ink-wash-painting-like image processing is initiated, and a sequence of processing is executed as follows.

In Step S11, the original image acquisition unit 41 acquires data of the original image.

In Step S12, the characteristic region detection unit 42 executes smoothing processing on the data of the original image. The smoothing processing refers to image processing, in which noise and fine texture included in the original image are considered to be unnecessary in an ink-wash-painting-like image, and are therefore removed or reduced from an original image, thereby smoothing the original image such that the edge representing the contour of the subject is preserved.

In Step S13, the importance information calculation unit 43 executes importance region calculation processing to be described below with reference to FIG. 9, thereby calculating importance information of the original image from the data of the original image acquired by the original image acquisition unit 41.

In Step S14, the image processing unit 14 executes monochromatic processing on the data of the original image, thereby generating data of the edge image that is made binary (black and white).

In Step S15, the ink-wash painting conversion unit 44 executes ink-wash-painting-like image generation processing to be described below with reference to FIG. 10, thereby converting the data of the edge image into data of the ink-wash-painting-like image.

In Step S16, the gradation unit 61 executes overall gradation processing to be described below with reference to FIG. 11, thereby calculating an amount of gradation in each pixel, and executing the gradation processing on the entire data of the ink-wash-painting-like image, based on the amount of gradation calculated for each pixel.

In Step S17, the margin region setting unit 62 executes margin region setting processing to be described below with reference to FIG. 12, thereby executing synthesis processing of synthesizing each data of the ink-wash-painting-like image, on which the gradation processing was executed, and the white background image, based on the importance barycenter of the ink-wash-painting-like image (the importance barycenter of the original image) and the barycenter of the white background image.

In Step S18, the image processing unit 14 stores the data of the ink-wash-painting-like image with the margin region being set, i.e. the data of the image, in which the margin region was added to the ink-wash-painting-like image, on which the gradation processing was executed, into the storage unit 19 shown in FIG. 1.

It should be noted that the size of the image with the margin region added to the ink-wash-painting-like image, i.e. the resolution, may be identical to the resolution of the original image, and may be different from the resolution of the original image. However, in a case in which the size is made identical to the size of the original image, the image processing unit 14 executes reduction processing on the data of the image with the margin region added to the ink-wash-painting-like image, such that the size coincides with the size of the original image.

As a result, the ink-wash-painting-like image processing is completed.

The flow of the ink-wash-painting-like image processing has been described above with reference to FIG. 8.

Next, regarding the ink-wash-painting-like image processing shown in FIG. 8, a detailed flow of the importance region calculation processing in Step 13 is described with reference to FIG. 9.

FIG. 9 is a flowchart illustrating the importance region calculation processing.

In Step S31, the importance calculation unit 51 calculates importance of each pixel of the original image. For example, in the example shown in FIG. 3, importance of each pixel 101 of the original image 100 is calculated.

In Step S32, the importance barycenter calculation unit 53 calculates an importance barycenter of the original image, based on the importance of each pixel thus calculated. For example, in the example shown in FIG. 3, an importance barycenter 11 of the original image 100 is calculated based on the importance of each pixel 101.

In Step 33, the importance region calculation unit 52 calculates an importance region of the original image, based on pixels having importance of at least a threshold value. For example, in the example shown in FIG. 3, the importance region 102 of the original image 100 is calculated from the pixels 101.

As a result, the importance region calculation processing is terminated, i.e. the processing in Step S13 shown in FIG. 8 is terminated, and the processing advances to Step S14.

The flow of the importance region calculation processing has been described above with reference to FIG. 9.

Next, regarding the ink-wash-painting-like image processing shown in FIG. 8, a detailed flow of the ink-wash-painting-like image generation processing in Step S15 is described with reference to FIG. 10.

FIG. 10 is a flowchart illustrating the ink-wash-painting-like image generation processing.

In Step S51, the characteristic region detection unit 42 searches the data of the edge image for an edge.

In Step S52, the characteristic region detection unit 42 determines whether an edge exists, based on a result of the processing in Step S51.

In a case in which an edge exists, in Step S53, the characteristic region detection unit 42 traces the edge.

More specifically, the characteristic region detection unit 42 scans the edge image in a so-called raster sequence from the upper left, and searches for pixels belonging to the edge region (Step S51). In a case in which a pixel belonging to such an edge region exists (Step S52: YES), the characteristic region detection unit 42 traces the edge so as to search for other pixels belonging to the edge region (Step S53).

In Step S4, based on the edge region traced in this manner, the ink-wash painting conversion unit 44 determines a brushstroke pattern to be used in subsequent steps, from among brushstroke patterns, of which data is stored in the brushstroke pattern storage unit (not shown).

More specifically, the ink-wash painting conversion unit 44 determines an upright-brush brushstroke pattern as the brushstroke pattern to be used for the edge region that was traced in the processing in Step S53. Moreover, the ink-wash painting conversion unit 44 determines an oblique-brush brushstroke pattern as the brushstroke pattern to be used for the surrounding region of the edge region. Furthermore, in a case in which the edge region is a region of a closed curve, the ink-wash painting conversion unit 44 determines the oblique-brush brushstroke pattern as the brushstroke pattern to be used for the inside of the closed curve.

In Step S55, the ink-wash painting conversion unit 44 executes processing of converting the data of the edge region into data of the upright-brush brushstroke pattern, such that the upright-brush brushstroke pattern is applied to the edge region that was traced in the processing in Step S53 (hereinafter referred to as "application processing").

More specifically, since the length of the edge region traced in the processing in Step S53 (the length of a longitudinal curve) is different each time, the ink-wash painting conversion unit 44 enlarges or reduces the data of the upright-brush brushstroke pattern that is read from the brushstroke pattern storage unit (not shown), in accordance with the length of the edge region. In addition, the ink-wash painting conversion unit 44 converts (applies) the data of the edge region into (to) the data of the upright-brush brushstroke pattern that was enlarged or reduced.

In Step S56, based on the importance region calculated in the processing in Step S33 (FIG. 9), the ink-wash painting conversion unit 44 calculates a drawing color of the upright-brush brushstroke pattern, on which the application processing was executed in Step S55. The drawing color, i.e. the gray level of the ink, is determined in accordance with the importance of the original image. Since the importance has a value for each pixel, when the drawing color is determined, the ink-wash painting conversion unit 44 calculates an average of the importance in a region to be drawn with a brush. The ink-wash painting conversion unit 44 draws in a darker color (a color closer to black) as the average importance thus calculated is higher, and draws in a lighter color (a color closer to white) as the average importance is lower. Also in processing in Steps S59 and S63 to be described below, similarly to the processing in Step S56, the ink-wash painting conversion unit 44 calculates a drawing color based on an average of the importance.

In Step S57, based on the importance region calculated in the processing in Step S33 (FIG. 9), the ink-wash painting conversion unit 44 executes gradation processing on the upright-brush brushstroke pattern, on which the application processing was executed in Step S55. In this case, similarly to the manner in which the ink-wash painting conversion unit 44 determines a gray level of the ink based on the importance of the image, the ink-wash painting conversion unit 44 determines an amount (width) of gradation based on the importance of the image. When the importance is higher, the color of the ink is darker, and thus the ink-wash painting conversion unit 44 reduces the amount of gradation; and when the importance is lower, the color of the ink is lighter, and thus the ink-wash painting conversion unit 44 increases the amount of gradation. Also in processing in Steps S60 and S64 to be described below, similarly to the processing in Step S57, the ink-wash painting conversion unit 44 executes gradation processing based on the importance.

In Step S58, the ink-wash painting conversion unit 44 executes application processing, such that the oblique-brush brushstroke pattern is applied to the surrounding region of the edge region traced in the processing in Step S53.

In Step S59, based on the importance region calculated in the processing in Step S33 (FIG. 9), the ink-wash painting conversion unit 44 calculates a drawing color of the oblique-brush brushstroke pattern, on which the application processing was executed in Step S58.

In Step S60, based on the importance region calculated in the processing in Step S33 (FIG. 9), the ink-wash painting conversion unit 44 executes gradation processing on the oblique-brush brushstroke pattern, on which the application processing was executed in Step S58.

In Step S61, the ink-wash painting conversion unit 44 determines whether the edge region traced in the processing in Step S53 is a region of a closed curve.

In a case in which the edge region is not a region of a closed curve, i.e. in a case in which the region is a region with a starting point and an ending point, the determination in Step S61 is NO, the processing returns to Step S51 in which another edge is searched, and the processing in and after Step S52 is repeated.

On the other hand, in a case in which the edge region is a region of a closed curve, i.e. in a case in which the region is a region without a starting point and an ending point, the determination in Step S61 is YES, and the processing advances to Step S62.

In Step S62, the ink-wash painting conversion unit 44 executes application processing, such that the oblique-brush brushstroke pattern is applied to the inside of the closed curve of the edge region traced in the processing in Step S53.

In Step S63, based on the importance region calculated in the processing in Step S33 (FIG. 9), the ink-wash painting conversion unit 44 calculates a drawing color of the oblique-brush brushstroke pattern, on which the application processing was executed in Step S62.

In Step S64, based on the importance region calculated in the processing in Step S33 (FIG. 9), the ink-wash painting conversion unit 44 executes gradation processing on the oblique-brush brushstroke pattern, on which the application processing was executed in Step S62.

Subsequently, the processing returns to Step S51 in which another edge is searched, and the processing in and after Step S52 is repeated.

In this way, the loop processing in Steps S51 to S64 is repeatedly executed on each edge region included in the edge image. In addition, when the processing on the last edge region is completed, since an edge cannot be searched in the processing in the next Step S51, the determination in the next Step S52 is NO, and the ink-wash-painting-like image generation processing is terminated. In other words, the processing in Step 15 shown in FIG. 8 is terminated.

The flow of the ink-wash-painting-like image generation processing has been described above with reference to FIG. 10.

Next, regarding the ink-wash-painting-like image processing shown in FIG. 8, a detailed flow of the overall gradation processing in Step S16 is described with reference to FIG. 11.

Figure 11:
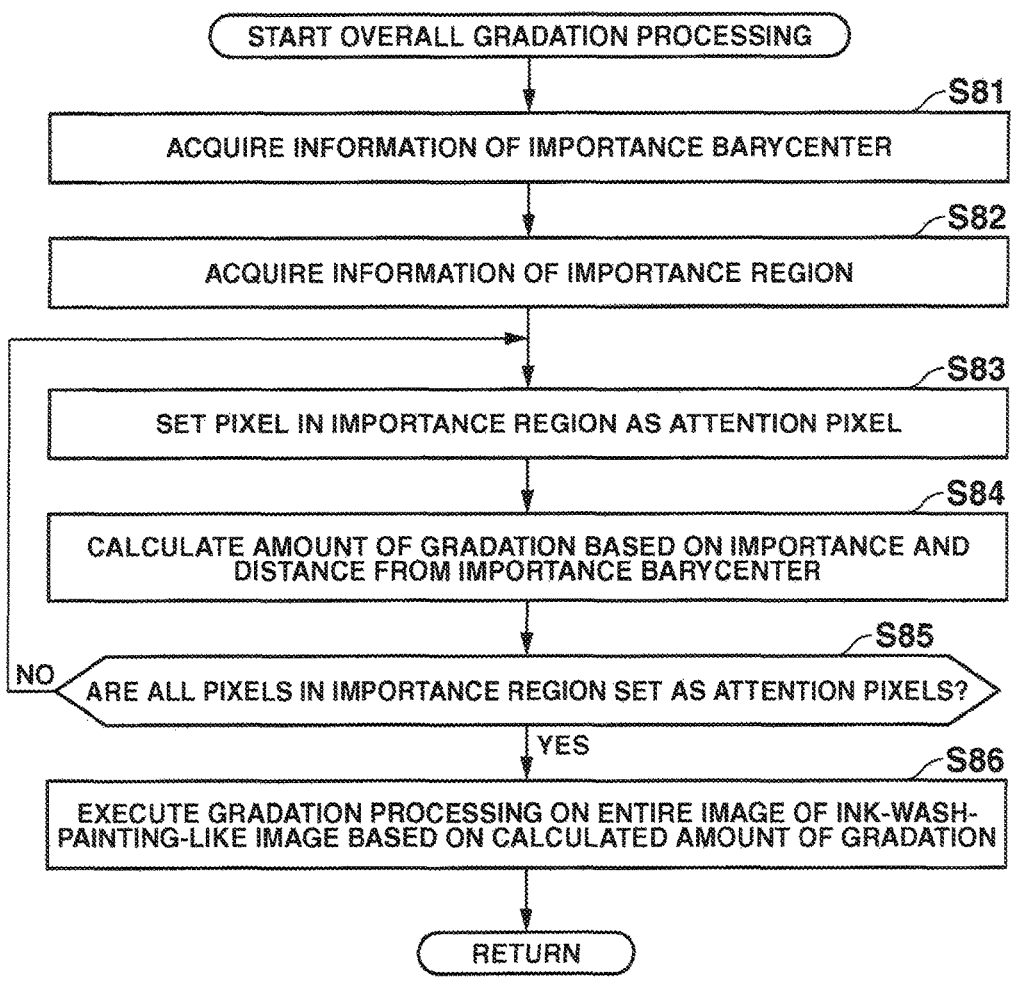
FIG. 11 is a flowchart illustrating overall gradation processing, regarding the ink-wash-painting-like image processing shown in FIG. 8.

FIG. 11 is a flowchart illustrating the overall gradation processing.

In Step S81, the gradation unit 61 acquires importance barycenter information calculated by the importance barycenter calculation unit 53.

In Step S82, the gradation unit 61 acquires information of the importance region calculated by the importance region calculation unit 52.

In Step S83, the gradation unit 61 sets one pixel in the importance region of the original image as an attention pixel.

In Step S84, the gradation unit 61 calculates an amount of gradation, based on the importance of the attention pixel, and based on a distance between each pixel and the importance barycenter acquired in Step S81.

In Step S85, the gradation unit 61 determines whether all pixels in the importance region have been set as attention pixels. In a case in which all pixels in the importance region have not been set as attention pixels in Step S83, the determination in Step S85 is NO, and the processing returns to Step S83. In other words, the processing in Steps S83 to S85 is repeated until the amount of gradation is calculated for all pixels. On the other hand, in a case in which all pixels in the importance region have been set as attention pixels in Step S83, the determination in Step S85 is YES, and the processing advances to Step S86.

In Step S86, the gradation unit 61 executes gradation processing of gradating the entire image of the original image, based on the gradation amount calculated for each pixel in Step S84. When this processing is terminated, the overall gradation processing is terminated, i.e. the processing in Step 16 shown in FIG. 8 is terminated, and the processing advances to Step S17.

The flow of the overall gradation processing has been described above with reference to FIG. 11.

Next, regarding the ink-wash-painting-like image processing shown in FIG. 8, a detailed flow of the margin region setting processing in Step S17 is described with reference to FIG. 12.

Figure 12:
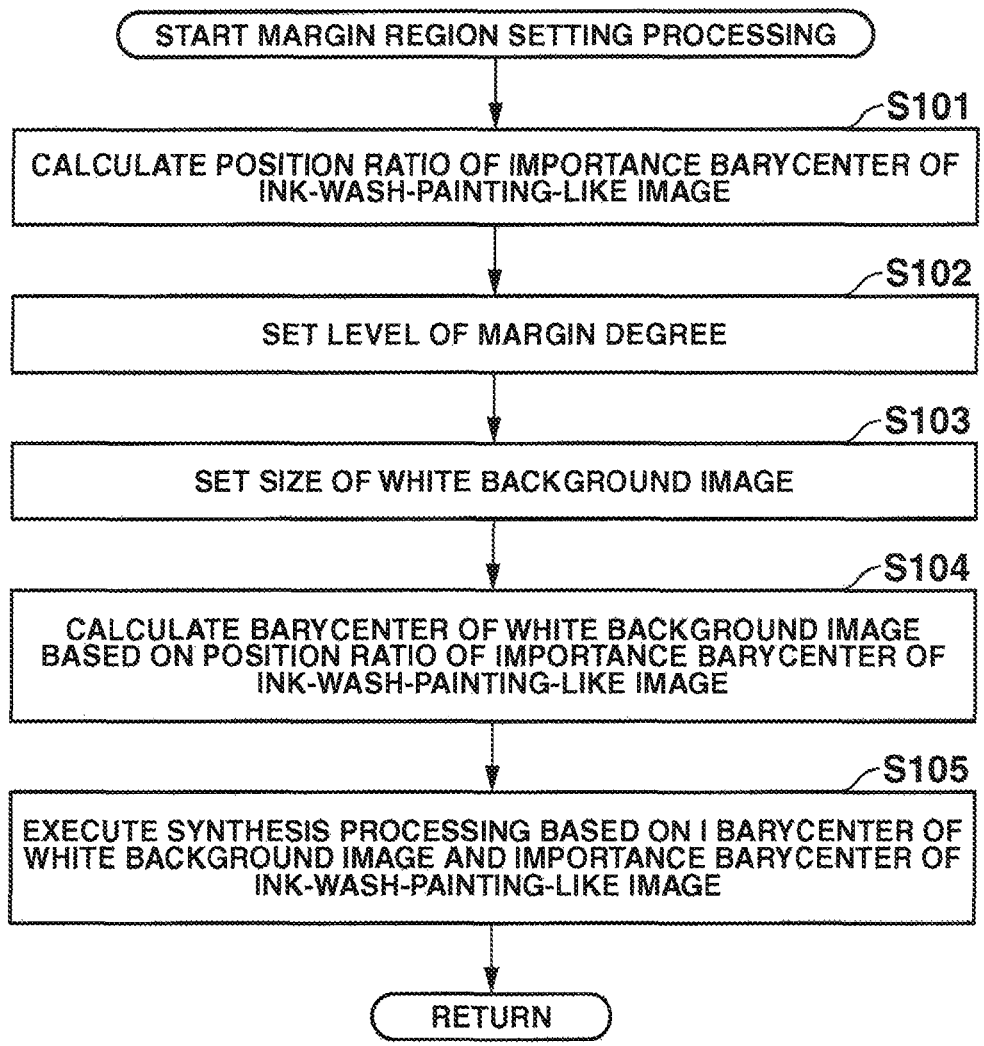
FIG. 12 is a flowchart illustrating margin region setting processing, regarding the ink-wash-painting-like image processing shown in FIG. 8.

FIG. 12 is a flowchart illustrating the margin region setting processing.

In Step S101, the importance barycenter position ratio calculation unit 71 calculates a position ratio of the importance barycenter of the ink-wash-painting-like image. For example, in the example shown in FIG. 7, a position ratio of the importance barycenter 111 of the original image 100 is calculated.

In Step S102, the margin region setting unit 62 sets a level of the margin degree of the margin region 140 shown in FIG. 7, based on the operation by the user. For example, in the example shown in FIG. 7, a level of the margin degree of the margin region 140 is set.

In Step S103, the margin region setting unit 62 sets a size of the white background image. For example, in the example shown in FIG. 7, a size of the white background image 130 is set.

In Step S104, the background image position ratio calculation unit 72 calculates a barycenter of the white background image. For example, in the example shown in FIG. 7, the barycenter 131 of the white background image 130 is calculated.

In Step S105, the synthesis unit 73 executes synthesis processing of synthesis and superimposition such that a position of the coordinates of the barycenter of the white background image coincides with a position of the coordinates of the importance barycenter of the ink-wash-painting-like image, based on the barycenter of the white background image and the importance barycenter of the ink-wash-painting-like image. For example, in the example shown in FIG. 7, the synthesis processing of synthesis and superimposition is executed, such that the positions of the coordinates of the barycenter 131 and the importance barycenter 111 coincide with each other, based on the barycenter 131 of the white background image 130 and the importance barycenter 111 of the original image 100. When this processing is terminated, the margin region setting processing is terminated, i.e. the processing in Step 17 shown in FIG. 8 is terminated, and the processing advances to Step S18.

The image processing apparatus of the first embodiment configured as above includes the original image acquisition unit 41, the characteristic region detection unit 42, the importance information calculation unit 43, the ink-wash painting conversion unit 44, and the conversion unit 45.

The original image acquisition unit 41 acquires data of the original image 100.

The ink-wash painting conversion unit 44 converts the data of the original image 100 acquired by the original image acquisition unit 41 into data of the ink-wash-painting-like image 120.

The characteristic region detection unit 42 detects a characteristic region (an edge region in the present embodiment) of the original image 100 from the data of the original image 100 acquired by the original image acquisition unit 41.

The importance information calculation unit 43 calculates importance information of the original image 100, based on the data of the original image 100 acquired by the original image acquisition unit 41.

As the image processing of further converting the data of the ink-wash-painting-like image that was converted by the ink-wash painting conversion unit 44, the conversion unit 45 executes the gradation processing of gradating the characteristic region detected by the characteristic region detection unit 42, and the margin setting processing of setting the margin region 140 to be added to the ink-wash-painting-like image, based on the importance information calculated by the importance information calculation unit 43.

In this way, as a result of executing the gradation processing on the ink-wash-painting-like image 120 based on the importance information of the original image 100, a natural brush drawing of an ink-wash painting can be faithfully expressed. As a result, it is possible to obtain an image that is more similar to a real ink-wash painting.

Similarly, as a result of executing the margin setting processing of setting the margin region 140 to be added to the ink-wash-painting-like image 120 based on the importance information of the original image 100, a natural composition of an ink-wash painting can be faithfully expressed. As a result, it is possible to obtain an image that is more similar to a real ink-wash painting.

The importance information calculation unit 43 of the image processing apparatus of the present embodiment includes the importance calculation unit 51 and the importance barycenter calculation unit 53.

The importance calculation unit 51 calculates importance of each pixel 101 composing the original image 100.

Based on the importance of each pixel 101 calculated by the importance calculation unit 51, the importance barycenter calculation unit 53 calculates the importance barycenter 111 of the original image 100. In addition, based on the importance barycenter calculated by the importance barycenter calculation unit 53, the conversion unit 45 executes conversion of the data of the ink-wash-painting-like image 120.

In this way, as a result of executing the conversion of the data of the ink-wash-painting-like image 120 based on the importance barycenter, an object drawn as an ink-wash painting can be expressed based on a drawing method peculiar to the ink-wash painting. As a result, it is possible to obtain an image that is further remarkably similar to a real ink-wash painting.

The conversion unit 45 of the image processing apparatus of the present embodiment includes the gradation unit 61.

The gradation unit 61 executes the gradation processing on the characteristic region detected by the characteristic region detection unit 42, and an object(s) in at least one region in the characteristic region, based on the importance barycenter calculated by the importance barycenter calculation unit 53.

In this way, as a result of executing the gradation processing based on the importance barycenter, an object drawn as an ink-wash painting can be expressed based on a drawing method peculiar to the ink-wash painting. As a result, it is possible to obtain an image that is further remarkably similar to a real ink-wash painting.

The conversion unit 45 of the image processing apparatus of the present embodiment includes the importance barycenter position ratio calculation unit 71 and the background image position ratio calculation unit 72.

The importance barycenter position ratio calculation unit 71 calculates a position ratio of the importance barycenter calculated by the importance barycenter calculation unit 53.

Based on the position ratio of the importance barycenter calculated by the importance barycenter position ratio calculation unit 71, the background image position ratio calculation unit 72 calculates a barycenter position ratio of a white background image 130.

Based on the position ratio of the importance barycenter calculated by the importance barycenter position ratio calculation unit 71, and based on the position ratio of the barycenter of the white background image 130 calculated by the background image position ratio calculation unit 72, the conversion unit 45 synthesizes the data of the white background image 130 and the data of the ink-wash-painting-like image, thereby setting the margin region 140 to be added to the ink-wash-painting-like image 120.

In this way, as a result of setting the margin region 140 of the ink-wash-painting-like image 120 based on the position ratio of the importance barycenter, a natural composition of an ink-wash painting can be faithfully expressed. As a result, it is possible to obtain an image that is more similar to a real ink-wash painting.

The importance information calculation unit 43 of the image processing apparatus of the present embodiment further includes the importance region calculation unit 52.

The importance region calculation unit 52 calculates the importance region 102, based on the importance calculated for each pixel 101 by the importance calculation unit 51.

In addition, based on the importance of each pixel 101 in the importance region 102 calculated by the importance region calculation unit 52, and based on a distance between each pixel and the importance barycenter 111 calculated by the importance barycenter calculation unit 53, the gradation unit 61 calculates an amount of gradation in each pixel.

By executing the gradation processing in accordance with the importance of each pixel 101 and the distance from the importance barycenter in this way, it is possible to appropriately express a blur of an ink peculiar to an ink-wash painting. As a result, it is possible to obtain an image that is further remarkably similar to a real ink-wash painting.

The image processing apparatus 1 according to the first embodiment of the present invention has been described above.

Second Embodiment

Next, an image processing apparatus 1 according to a second embodiment of the present invention is described.

The image processing apparatus 1 according to the second embodiment of the present invention can have a hardware configuration and a functional configuration that are basically similar to those of the image processing apparatus 1 according to the first embodiment.

Therefore, FIG. 1 is also a block diagram showing the hardware configuration of the image processing apparatus 1 according to the second embodiment.

Furthermore, ink-wash-painting-like image processing, importance region calculation processing, and ink-wash-painting-like image generation processing executed by the image processing apparatus 1 according to the second embodiment are basically similar to the flows of those processing according to the first embodiment. Therefore, FIGS. 8, 9 and 10 are also flowcharts illustrating the ink-wash-painting-like image processing, the importance region calculation processing, and the ink-wash-painting-like image generation processing according to the second embodiment.

Figure 13:
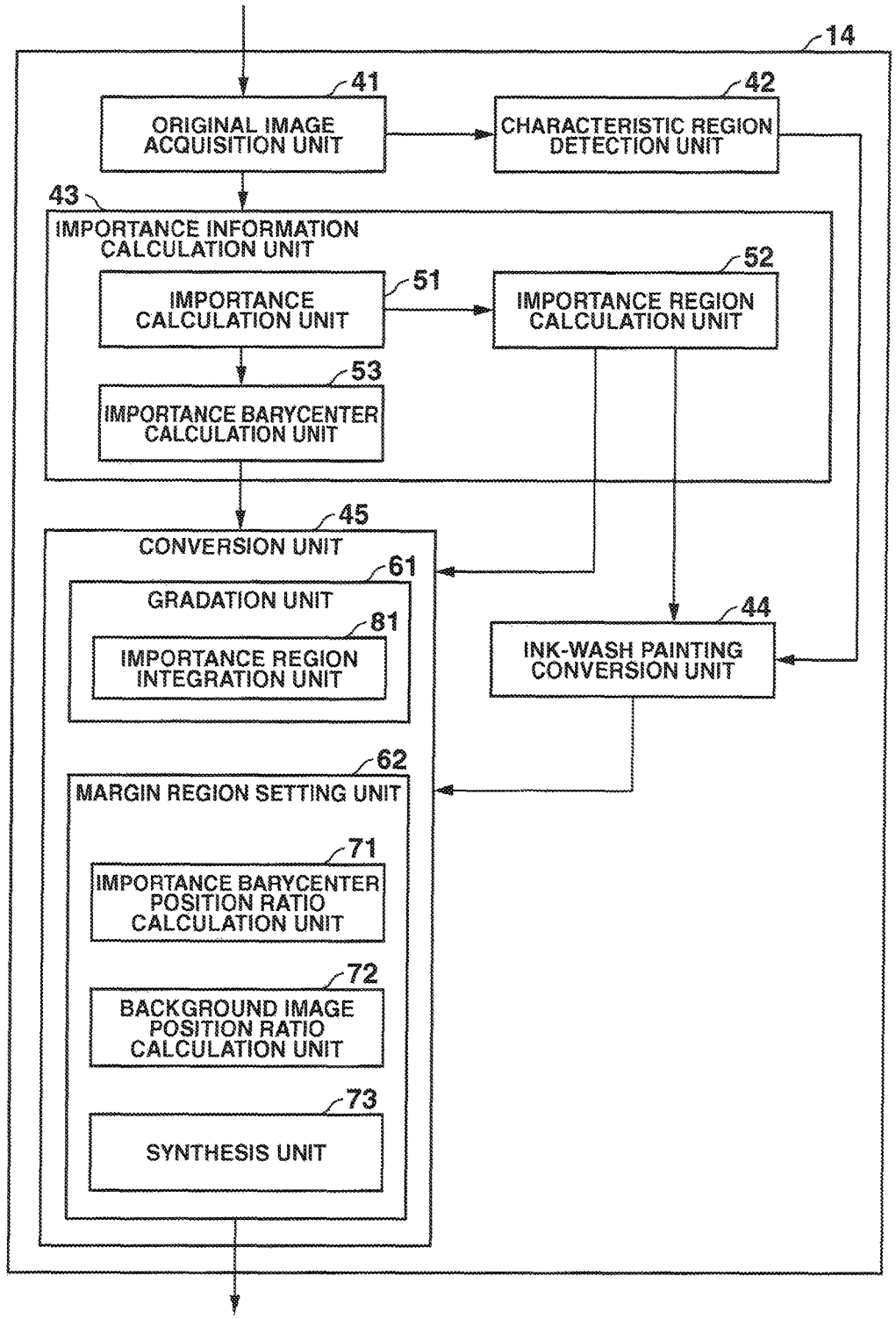
FIG. 13 is a functional block diagram showing a functional configuration for executing overall gradation processing according to a second embodiment.

FIG. 13 is a functional block diagram showing a functional configuration for executing overall gradation processing according to the second embodiment, regarding the functional configuration of the image processing apparatus 1 of the present invention.

When FIG. 2 is compared with FIG. 13, the functional configuration of the image processing unit 14 of the image processing apparatus 1 according to the second embodiment is basically similar to that of the image processing apparatus 1 according to the first embodiment, except in a case in which there are a plurality of importance regions, the plurality of importance regions are integrated as an integrated importance region; therefore, descriptions thereof are omitted. In other words, the gradation unit 61 of the image processing apparatus 1 of the first embodiment calculates an amount of gradation in each pixel, based on the importance of each pixel inside the importance region, and a distance between each pixel and the importance barycenter.

On the other hand, in a case in which there are a plurality of importance regions, the gradation unit 61 of the image processing apparatus 1 of the second embodiment integrates the plurality of importance regions as an integrated importance region, and calculates an amount of gradation inside such an importance region, based on processing similar to that in the first embodiment. In addition, outside the importance region, the gradation unit 61 of the image processing apparatus 1 of the second embodiment calculates an amount of gradation in each pixel, based on the importance of each pixel inside the integrated importance region, a distance between each pixel and the importance barycenter, and the importance barycenter as well as an edge direction of the integrated importance region.

It should be noted that the units including the original image acquisition unit 41 to the ink-wash painting conversion unit 44 as well as the margin region setting unit 62 in the conversion unit 45 of the image processing apparatus 1 of the second embodiment are similar to the units including the original image acquisition unit 41 to the ink-wash painting conversion unit 44 as well as the margin region setting unit 62 in the conversion unit 45 of the image processing apparatus 1 of the first embodiment, respectively; therefore, detailed descriptions thereof are omitted, and only different points are described.

FIG. 13 is a functional block diagram showing a functional configuration for executing overall gradation processing according to the second embodiment, regarding the functional configuration of the image processing apparatus shown in FIG. 1.

In a case in which there is a single importance region, the overall gradation processing according to the second embodiment is executed similarly to the gradation processing of the first embodiment. In addition, in a case in which there are a plurality of importance regions, the gradation unit 61 integrates the plurality of importance regions as an integrated importance region, and calculates an amount of gradation in each pixel, based on the importance of each pixel inside the integrated importance region, a distance between each pixel and the importance barycenter, and the importance barycenter as well as an edge direction of the integrated importance region. In addition, the gradation unit 61 executes gradation processing on the entire image of the ink-wash-painting-like image, based on the amount of gradation thus calculated.

In the second embodiment, the gradation unit 61 further includes an importance region integration unit 81 for executing the overall gradation processing according to the second embodiment.

In a case in which there are a plurality of importance regions calculated by the importance region calculation unit 52, the importance region integration unit 81 integrates the plurality of importance regions calculated by the importance region calculation unit 52 as an integrated importance region.

Regarding the integrated importance region, inside the importance region, the gradation unit 61 of the second embodiment calculates an amount of gradation in each pixel, based on the importance of each pixel in the importance region, and a distance between each pixel and the importance barycenter calculated by the importance barycenter calculation unit; and outside the importance region, the gradation unit 61 of the second embodiment calculates an amount of gradation in each pixel, based on the importance of each pixel inside the integrated importance region, a distance between each pixel and the importance barycenter calculated by the importance barycenter calculation unit, and the importance barycenter as well as an edge direction of the integrated importance region.

Figure 14:
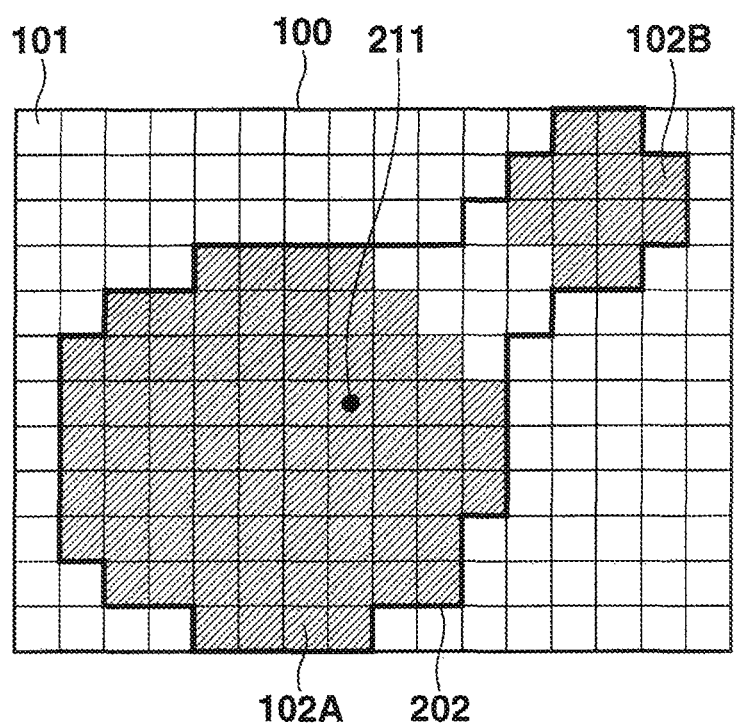
FIG. 14 shows an example of data of an original image of the second embodiment.

FIG. 14 shows an example of data of an original image 100 of the second embodiment.

In FIG. 14, gray regions are a plurality of importance regions 102A and 102B, among each of a plurality of pixels 101 composing the original image 100. In addition, an integrated importance region 202 integrated from the plurality of importance regions 102A and 102B is shown in a black frame. Moreover, an importance barycenter 211 calculated based on the integrated importance region 202 is shown in a substantially central portion of the integrated importance region 202.

Figure 15:
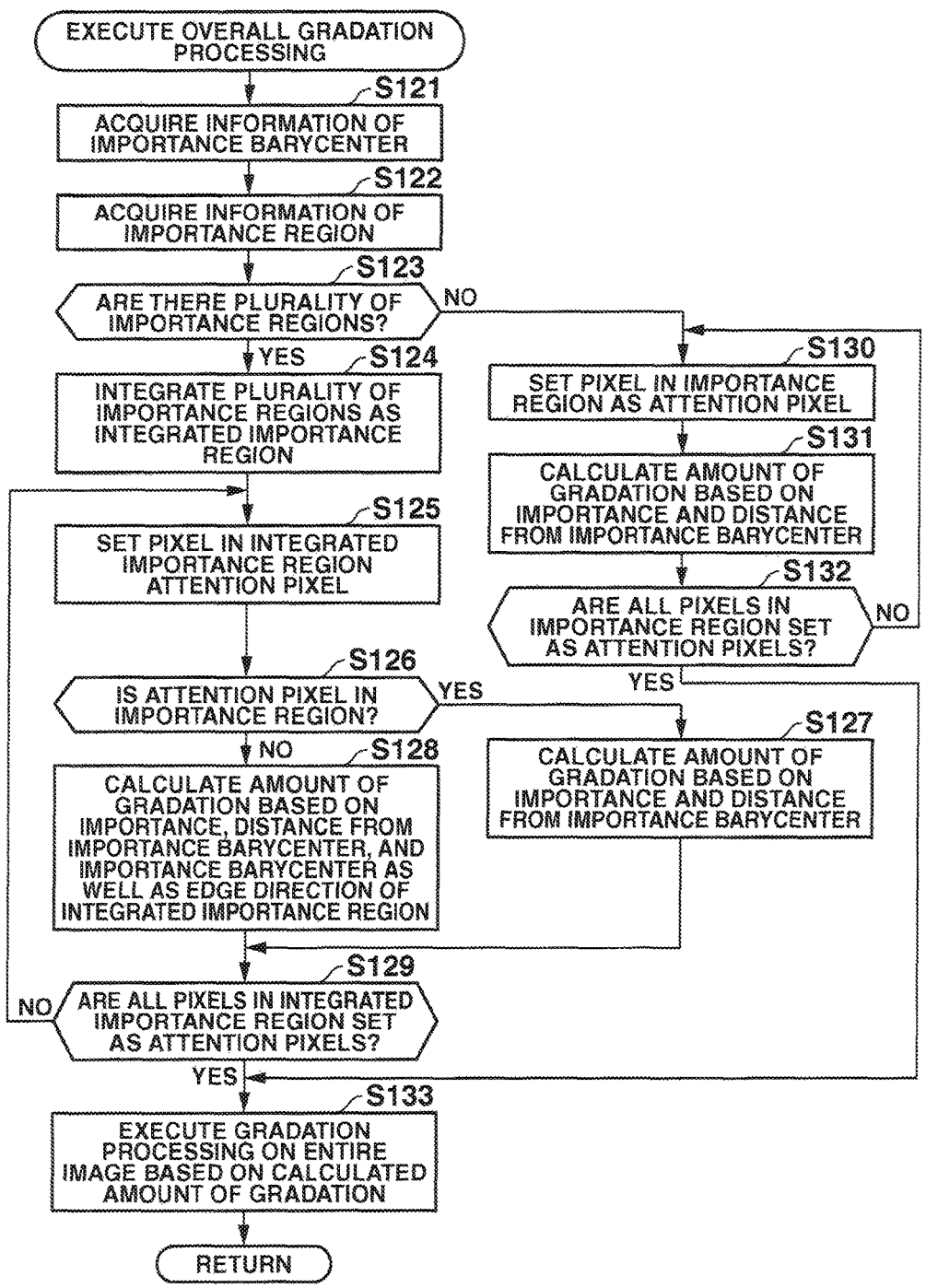
FIG. 15 is a flowchart illustrating the overall gradation processing, regarding the ink-wash-painting-like image processing of the second embodiment.

FIG. 15 is a flowchart illustrating the overall gradation processing in Step S16, regarding the ink-wash-painting-like image processing shown in FIG. 8.

In Step S121, the gradation unit 61 acquires importance barycenter information calculated by the importance barycenter calculation unit 53.

In Step S122, the gradation unit 61 acquires information of the importance region calculated by the importance region calculation unit 52.

In Step S123, the gradation unit 61 determines whether there are plurality of importance regions calculated by the importance region calculation unit 52. In a case in which the importance region is determined to be not plural, i.e. to be singular, the processing advances to Step S130, and processing similar to the overall gradation processing in Steps S83 to S85 shown in FIG. 11 is executed. In this case, since processing in Steps S130 to S132 of the second embodiment is similar to the processing in Steps S83 to S85 of the first embodiment, descriptions thereof are omitted. On the other hand, in a case in which it is determined that there are a plurality of importance regions, the processing advances to Step S124.

In Step S124, the importance region integration unit 81 integrates the plurality of importance regions 102A and 102B shown in FIG. 14 as the integrated importance region 202.

In Step S125, the gradation unit 61 sets one pixel 101 in the integrated importance region 202 of the original image 100 shown in FIG. 14 as an attention pixel.

In Step S126, the gradation unit 61 determines whether the attention pixel that was set in Step S125 is a pixel in the importance region. For example, in the example shown in FIG. 14, the gradation unit 61 determines whether the attention pixel is a pixel 101 in the importance region 102A or 102B. In a case in which the attention pixel is a pixel in the importance region, the processing advances to Step S127, and processing similar to the overall gradation processing in Step S84 of the first embodiment shown in FIG. 11 is executed. In this case, since processing in Step S127 of the second embodiment is similar to the processing in Step S84 of the first embodiment, descriptions thereof are omitted. On the other hand, in a case in which it is determined that the attention pixel is not a pixel in the importance region, the processing advances to Step S128.

In Step S128, the gradation unit 61 calculates an amount of gradation, based on the importance of the attention pixel, a distance from the importance barycenter acquired in Step S121, and the importance barycenter as well as an edge direction of the integrated importance region.

In Step S129, the gradation unit 61 determines whether all pixels in the integrated importance region have been set as attention pixels. In a case in which all pixels in the integrated importance region have not been set as attention pixels in Step S125, the determination in Step S129 is NO, and the processing returns to Step S125. In other words, the processing in Steps S125 to S129 is repeated until the amount of gradation is calculated for all pixels in the integrated importance region. On the other hand, in a case in which all pixels in the integrated importance region have been set as attention pixels in Step S125, the determination in Step S129 is YES, and the processing advances to Step S133.

In Step S133, the gradation unit 61 executes gradation processing of gradating the entire image of the original image, based on the gradation amount calculated for each pixel in Steps S128, S128 and S131. When this processing is terminated, the overall gradation processing is terminated, i.e. the processing in Step 16 shown in FIG. 8 is terminated, and the processing advances to Step S17.

The gradation unit 61 of the image processing apparatus of the second embodiment configured as above includes the importance region integration unit 81.

In a case in which there are a plurality of importance regions calculated by the importance region calculation unit 52, the importance region integration unit 81 integrates the plurality of importance regions 102A and 102B shown in FIG. 14 calculated by the importance region calculation unit 52 as the integrated importance region 202.

Regarding the integrated importance region 202, inside the importance regions 102A and 102B, the gradation unit 61 calculates an amount of gradation in each pixel 101, based on the importance of each pixel 101 in the importance regions 102A and 102B, and a distance between each pixel 101 and the importance barycenter 211 calculated by the importance barycenter calculation unit 53; and outside the importance regions 102A and 102B, the gradation unit 61 calculates an amount of gradation in each pixel 101, based on the importance of each pixel 101 inside the integrated importance region 202, a distance between each pixel 101 and the importance barycenter 211 calculated by the importance barycenter calculation unit 53, and the importance barycenter 211 as well as an edge direction of the integrated importance region 202. In the original image 100, an important pixel 101 being at a distance from the importance barycenter may be determined to be not very important although it is actually important. On the other hand, in the present embodiment, in a case in which there are a plurality of importance regions 102A and 102B, the gradation unit 61 integrates the plurality of importance regions 102A and 102B as the integrated importance region 202. In this way, as a result of calculating the amount of gradation in consideration for the importance of each pixel 101 based on the plurality of importance regions, an object drawn as an ink-wash painting can be expressed based on a drawing method peculiar to the ink-wash painting. As a result, it is possible to obtain an image that is further remarkably similar to a real ink-wash painting.

It should be noted that the present invention is not limited to the embodiment described above, and any modifications and improvements thereof within the scope that can realize the object of the present invention are included in the present invention.

For example, the importance calculation unit 51 calculates importance, based on color information, brightness (brightness information), or information of an edge direction, within a predetermined range around each pixel; however, it is not limited thereto. For example, a technique can also be employed, in which the importance calculation unit 51 uses a spatial frequency in a particular region for the attention pixel to increase importance of a corresponding portion. Moreover, regarding data of a single original image, the importance calculation unit 51 scans a face search frame in a predetermined direction, identifies characteristic portions (face parts) corresponding to eyes, nose, mouth and the like, and determines whether it is a face, based on a positional relationship of each face part. In addition, the importance calculation unit 51 can also calculate predetermined importance in accordance with classification of a characteristic portion thus determined. Furthermore, the importance calculation unit 51 can also identify a particular object in a scenery photograph or a portrait to calculate predetermined importance in accordance with classification of the object thus identified. Moreover, the importance calculation unit 51 calculates importance of each pixel, but it is not limited thereto, and can calculate importance of each region.

In addition, for example, based on the position ratio of the importance barycenter calculated by the importance barycenter position ratio calculation unit 71, and based on the position ratio of the barycenter of the background image calculated by the background image position ratio calculation unit 72, the margin region setting unit 62 of the conversion unit 45 synthesizes the data of the background image and the data of the ink-wash-painting-like image, thereby setting the margin region to be added to the ink-wash-painting-like image; however, it is not limited thereto. For example, the margin region setting unit 62 of the conversion unit 45 may further include an image region division unit (not shown) that divides the data of the ink-wash-painting-like image into a plurality of regions. Furthermore, among the regions divided by the image region division unit (not shown), in a case in which a region including a pixel with high importance calculated by the importance calculation unit 51 is in contact with the periphery of the ink-wash-painting-like image, the margin region setting unit 62 may not add a margin region to the periphery of such a region. In this way, as a result of not adding a margin region to the periphery of the region including a pixel with high importance, a natural composition of an ink-wash painting can be faithfully expressed. As a result, it is possible to obtain an image that is more similar to a real ink-wash painting.

Moreover, for example, the amount of gradation calculated by the gradation unit 61 can be calculated so as to maximize an amount of gradation in the edge, by gradually changing a white-based contrast to zero, based on a predetermined function.

The image processing apparatus of the present invention can be applied to electronic devices in general that can execute the aforementioned image processing. More specifically, for example, the present invention can be applied to a personal computer, a smart phone, a printer, a television, a video camera, a portable navigation device, a cell phone device, a portable game device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the aforementioned functions are not particularly limited to the example in FIG. 2, so long as the image processing apparatus 1 can be provided with the functions enabling the aforementioned processing sequence to be executed as its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable media 31 shown in FIG. 1 distributed separately from the device main body for supplying the program to a user, but can also be constituted by a storage medium or the like supplied to the user in a state incorporated in the device main body in advance. The removable media 31 is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), or the like, for example. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. An image processing method for an image processing apparatus including a CPU and a memory storing an original image, the image processing method comprising executing, with the CPU:
    detecting a characteristic region of the original image stored in the memory;
    calculating an importance region by calculating importance information from the original image stored in the memory;
    calculating an importance barycenter of the calculated importance region based on an importance of each pixel of the calculated importance region;
    adding a margin region to the characteristic region based on the calculated importance barycenter; and
    generating and outputting a final output image in which the margin region has been added to the characteristic region of the original image;
    wherein calculating the importance information comprises:
        detecting the importance of each pixel composing the original image based on an indicator of the importance, by using a color, brightness, or an edge direction as the indicator of the importance, from the original image; and
        generating an importance map indicating spatial distribution of the importance detected for each pixel, to thereby calculate the importance information of the original image.

2. The image processing method according to claim 1, wherein calculating the importance information comprises:
    calculating the importance of each pixel composing the original image, based on a color, brightness, or information of an edge direction, within a predetermined range around each pixel; calculating the importance of each pixel composing the original image, based on whether pixels as representative values are important for a peripheral region around a particular region with respect to an attention pixel; and
    increasing an importance of a corresponding portion, when detecting an edge in a direction different from the edge direction around the attention pixel.

3. An image processing method for an image processing apparatus including a CPU and a memory storing an original image, the image processing method comprising executing, with the CPU:
    detecting a characteristic region of the original image stored in the memory;
    calculating an importance region by calculating importance information from the original image stored in the memory; and
    calculating an importance barycenter of the calculated importance region, based on importance of each pixel of the calculated importance region;
    adding a margin region to the characteristic region based on the calculated importance barycenter; and
    generating and outputting a final output image in which the margin region has been added to the characteristic region of the original image;
    wherein calculating the importance region comprises calculating a region with an importance evaluation value being 90 or higher as an importance region, in a case in which an upper limit of values of the calculated importance is 100.

4. An image processing method for an image processing apparatus including a CPU and a memory storing an original image, the image processing method comprising executing, with the CPU:
    detecting a characteristic region of the original image stored in the memory;
    calculating an importance region by calculating importance information from the original image stored in the memory;
    calculating an importance barycenter based on an importance of each pixel of the calculated importance region;
    adding a margin region to the characteristic region based on the calculated importance barycenter; and
    generating and outputting a final output image in which the margin region has been added to the characteristic region of the original image;
    wherein calculating the importance region comprises calculating the importance for each pixel composing the original image, and calculating the importance barycenter of the original image, based on the calculated importance of each pixel;
    wherein the importance barycenter is calculated by applying equations (1) and (2) to pixels having importance of at least a threshold value, where the importance barycenter in spatial distribution of the importance of each pixel is (x, y);
    wherein the threshold value is 90, in a case in which an upper limit of values of the importance is 100, and
    wherein equations (1) and (2) are as follows:

$$mx = 1/(n+\text{sumw}) * \Sigma(x * w(x,y)) \tag{1}$$

$$my = 1/(n+\text{sumw}) * \Sigma(y * w(x,y)) \tag{2}$$

where n represents a number of pixels having importance of at least the threshold value, sumw represents a sum of importance, w (x, y) represents a value of importance in (x, y), mx represents an x coordinate of the importance barycenter, and my represents a y coordinate of the importance barycenter.

5. An image processing apparatus comprising:
    a CPU; and
    a memory storing an original image,
    wherein the CPU is configured to:
    detect a characteristic region of the original image stored in the memory;
    calculate an importance region by calculating importance information from the original image stored in the memory;

calculate an importance barycenter of the calculated importance region based on an importance of each pixel of the calculated importance region;

add a margin region to the characteristic region based on the calculated importance barycenter; and generate and output a final output image in which the margin region has been added to the characteristic region of the original image;

wherein, to calculate the importance information, the CPU is configured to:

detect the importance of each pixel composing the original image based on an indicator of the importance, by using a color, brightness, or an edge direction as the indicator of importance, from the original image; and generate an importance map indicating spatial distribution of the importance detected for each pixel, to thereby calculate the importance information of the original image.

* * * * *